United States Patent
Li et al.

(10) Patent No.: US 12,250,669 B2
(45) Date of Patent: Mar. 11, 2025

(54) BEAM MANAGEMENT FOR SIDELINK

(71) Applicant: QUALCOMM Incorporated, San Diego, CA (US)

(72) Inventors: Qiaoyu Li, Beijing (CN); Chao Wei, Beijing (CN); Sudhir Kumar Baghel, Fremont, CA (US); Kapil Gulati, Belle Mead, NJ (US); Shailesh Patil, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 17/603,568

(22) PCT Filed: May 10, 2019

(86) PCT No.: PCT/CN2019/086396
§ 371 (c)(1),
(2) Date: Oct. 13, 2021

(87) PCT Pub. No.: WO2020/227850
PCT Pub. Date: Nov. 19, 2020

(65) Prior Publication Data
US 2022/0046631 A1    Feb. 10, 2022

(51) Int. Cl.
*H04W 72/044* (2023.01)
*H04B 7/0456* (2017.01)
(Continued)

(52) U.S. Cl.
CPC .......... *H04W 72/046* (2013.01); *H04B 7/048* (2023.05); *H04B 7/0695* (2013.01);
(Continued)

(58) Field of Classification Search
CPC .. H04B 17/327; H04B 7/0408; H04B 7/0695; H04B 7/088; H04L 5/0023;
(Continued)

(56) References Cited

U.S. PATENT DOCUMENTS

2007/0263705 A1*  11/2007  Tanaka ............... H04B 1/70752
                                                               375/150
2016/0295502 A1   10/2016  Yoon et al.
(Continued)

FOREIGN PATENT DOCUMENTS

CN       109104226 A    12/2018
EP        3468054 A1     4/2019
(Continued)

OTHER PUBLICATIONS

Zhang et al., "Beamforming and Grouping for NR V2X", Covinda Wireless, LLC., U.S. Appl. No. 62/791,055, filed Jan. 11, 2019, Total pp. 104 (Year: 2019).*

(Continued)

*Primary Examiner* — Shah M Rahman
(74) *Attorney, Agent, or Firm* — Patterson + Sheridan, L.L.P.

(57) ABSTRACT

Certain aspects of the present disclosure provide techniques for beam management between two or more user equipment (UEs). In some aspects, the disclosure is directed to methods and techniques for performing various beam management procedures (e.g., P1, P2, and P3 procedures) on a sidelink communication between two or more UEs.

27 Claims, 13 Drawing Sheets

(51) Int. Cl.
  *H04B 7/06* (2006.01)
  *H04B 7/08* (2006.01)
  *H04L 5/00* (2006.01)
  *H04L 5/14* (2006.01)
  *H04W 92/18* (2009.01)

(52) U.S. Cl.
  CPC ........... *H04B 7/088* (2013.01); *H04L 5/0048* (2013.01); *H04L 5/14* (2013.01); *H04W 92/18* (2013.01)

(58) Field of Classification Search
  CPC ... H04L 5/0048; H04L 5/0051; H04L 5/0094; H04L 5/14; H04L 5/1469; H04W 24/08; H04W 4/46; H04W 52/244; H04W 72/046; H04W 76/14; H04W 8/005; H04W 92/18
  See application file for complete search history.

(56) References Cited

U.S. PATENT DOCUMENTS

| | | | |
|---|---|---|---|
| 2018/0063883 A1 | 3/2018 | Nagaraja et al. | |
| 2018/0092129 A1 | 3/2018 | Guo et al. | |
| 2018/0146466 A1* | 5/2018 | Shen | H04W 72/23 |
| 2018/0220448 A1* | 8/2018 | Akkarakaran | H04L 5/0023 |
| 2018/0323926 A1* | 11/2018 | Cezanne | H04W 72/23 |
| 2018/0352525 A1* | 12/2018 | Li | H04W 56/004 |
| 2019/0053321 A1* | 2/2019 | Islam | H04W 72/542 |
| 2019/0349960 A1* | 11/2019 | Li | H04L 5/0055 |
| 2019/0372647 A1* | 12/2019 | Su | H04B 7/06954 |
| 2019/0379431 A1* | 12/2019 | Park | H04L 27/2613 |
| 2020/0304253 A1 | 9/2020 | Choi et al. | |
| 2020/0322032 A1* | 10/2020 | Xiang | H04B 7/088 |
| 2020/0351051 A1* | 11/2020 | Tang | H04L 5/0023 |
| 2021/0045103 A1* | 2/2021 | Kim | H04W 72/0446 |
| 2021/0168574 A1* | 6/2021 | Zhang | H04W 16/28 |
| 2021/0175943 A1* | 6/2021 | Xu | H04W 76/14 |
| 2021/0176789 A1* | 6/2021 | Takahashi | H04B 7/088 |
| 2021/0314974 A1* | 10/2021 | Miao | H04W 72/046 |
| 2021/0336686 A1* | 10/2021 | Rune | H04B 7/0617 |
| 2022/0039080 A1* | 2/2022 | Khoryaev | H04W 4/40 |

FOREIGN PATENT DOCUMENTS

| | | |
|---|---|---|
| WO | 2018127558 A1 | 7/2018 |
| WO | 2018143702 A1 | 8/2018 |
| WO | 2018183995 A1 | 10/2018 |
| WO | 2019059739 A1 | 3/2019 |

OTHER PUBLICATIONS

Spreadtrum Communications: "Considerations on Beam-Based Transmission for Sidelink", 3GPP TSG RAN WG1 Meeting #94bis, R1-1811003, 3GPP, Mobile Competence Centre, 650, Route Des Lucioles, F-06921 Sophia-Antipolis Cedex, France, vol. RAN WG1, No. Chengdu, China, Oct. 8, 2018-Oct. 12, 2018, 2 Pages, Sep. 29, 2018, XP051518407, p. 1-p. 2, section 3, figure 1.
Supplementary European Search Report—EP19928430—Search Authority—Munich—Nov. 11, 2022.
International Search Report and Written Opinion—PCT/CN2019/086396—ISA/EPO—Feb. 12, 2020.
Zte, et al., "Overall Consideration on NR V2X Resource Allocation," R2-1816981, 3GPP TSG-RAN WG2#104, Nov. 16, 2018 (Nov. 16, 2018), 6 pages, the whole document.

* cited by examiner

BEAM MANAGEMENT FOR SIDELINK

BACKGROUND

Field of the Disclosure

Aspects of the present disclosure relate to wireless communications, and more particularly, to techniques for beam management for sidelink communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations which are each capable of simultaneously supporting communication for multiple communication devices, otherwise known as user equipment (UE). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a base station, next generation NodeB (gNB or gNodeB), TRP, etc.). A base station or DU may communicate with a set of UEs on downlink channels (e.g., for transmissions from a base station or DU to a UE) and uplink channels (e.g., for transmissions from a UE to a base station or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a first user equipment (UE). The method generally includes selecting a first beam for transmission of a first signal used for beam management for a sidelink between the first UE and a second UE. The method also includes transmitting the first signal in a first plurality of transmissions, wherein each of the first plurality of transmissions is transmitted via the first beam according to a first periodic interval, and wherein the first signal is configured to provide the second UE with a basis for selecting a second beam for receiving data on the sidelink. The method also includes receiving, from the second UE, a second signal transmitted in a second plurality of transmissions according to a second periodic interval, wherein the second signal is configured to provide the first UE with a basis for selecting a third beam for receiving data on the sidelink. The method also includes selecting the third beam for reception of data on the sidelink, wherein the selection is based on the received second signal.

Certain aspects provide a method for wireless communication by a first UE. The method generally includes transmitting a message configured to initiate a beam sweeping operation for beam management of a sidelink between the first UE and a second UE. The method also includes transmitting a first plurality of signals, wherein each signal of the first plurality of signals is transmitted to the second UE via one of a first plurality of beams based on an initial beam previously used by the first UE, and wherein the first plurality of signals are configured to provide the second UE with a basis for measuring signal quality at each of the first plurality of beams. The method also includes receiving, from the second UE, a first report indicating a first preferred beam of the first plurality of beams, and switching from the initial beam previously used by the first UE to the first preferred beam.

Certain aspects provide a method for wireless communication by a first UE. The method generally includes transmitting a message configured to initiate a beam sweeping operation for beam management of a sidelink between the first UE and a second UE. The method also includes receiving a first plurality of signals in response to the message, wherein each signal of the first plurality of signals is received via one of a first plurality of beams based on an initial beam previously used by the second UE, and wherein the first plurality of signals are configured to provide the first UE with a basis for measuring signal quality at each of the first plurality of beams. The method also includes determining a first preferred beam from the first plurality of beams, wherein the determination is based on signal quality measured at one or more of the first plurality of beams. The method also includes transmitting a first report indicating the first preferred beam to the second UE.

Certain aspects provide a method for wireless communication by a first UE. The method generally includes transmitting a message configured to initiate a receive-beam refining operation for beam management of a sidelink between the first UE and a second UE. The method also includes transmitting a first signal in a first plurality of transmissions, wherein each of the first plurality of transmissions is transmitted via a beam previously used by the first UE for transmitting data on the sidelink, and wherein the first signal is configured to provide the second UE with a basis for refining a first receive-beam previously used by the second UE for receiving data through the sidelink.

Certain aspects provide a method for wireless communication by a first UE. The method generally includes transmitting a message configured to initiate a receive-beam refining operation for beam management of a sidelink between the first UE and a second UE. The method also includes receiving, from the second UE, a first signal transmitted in a first plurality of transmissions in response to the message, wherein each of the first plurality of transmissions is transmitted via a beam previously used by the second UE for transmitting data on the sidelink, and wherein the first signal is configured to provide the first UE with a basis for refining a first receive-beam previously used by the first UE for receiving data through the sidelink. The method also includes determining a second receive-beam from a first plurality of receive-beams based on a quality of the first signal measured at each of the first plurality of receive-beams.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
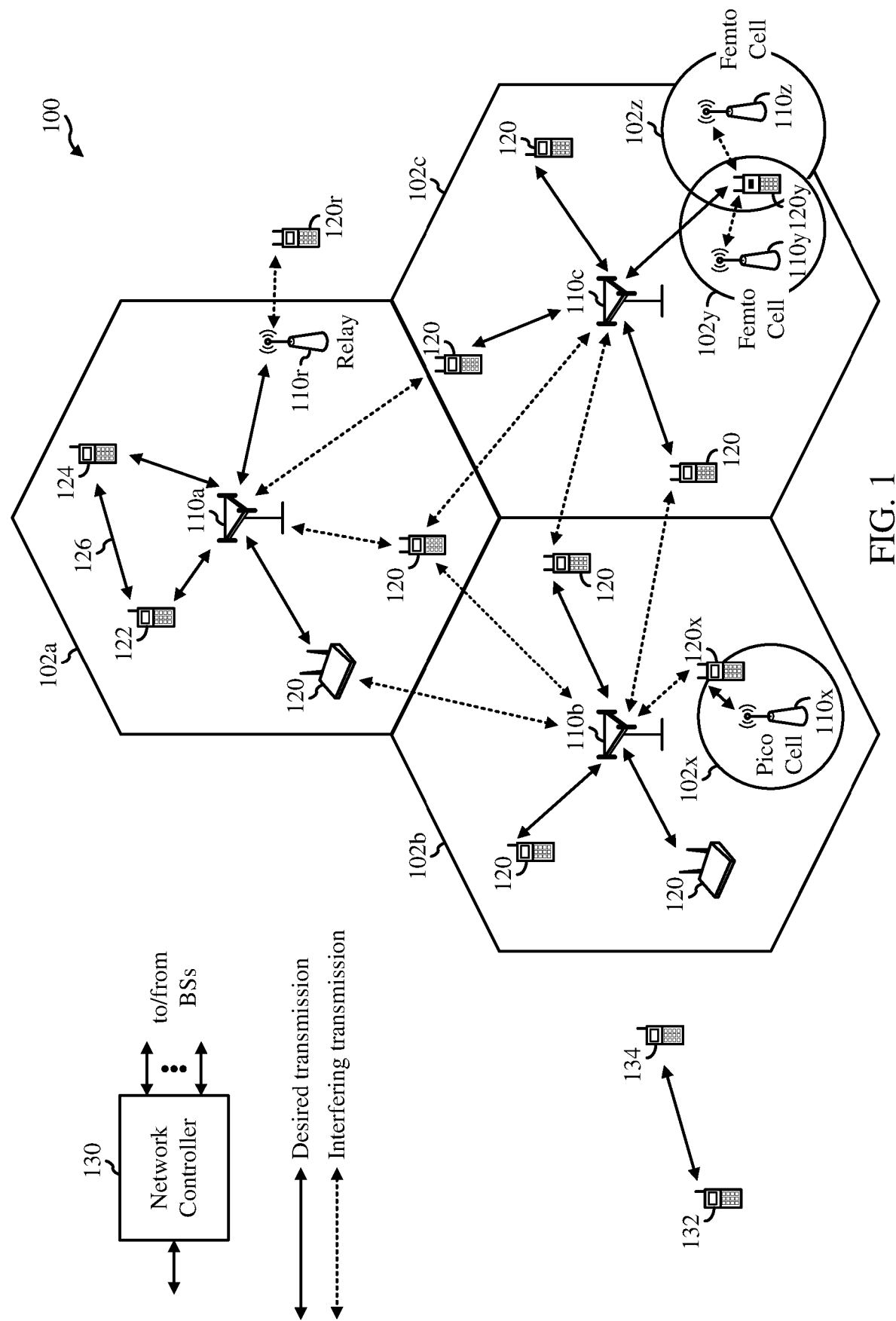
FIG. 1 is a block diagram conceptually illustrating an example telecommunications system, in accordance with certain aspects of the present disclosure.

Aspects of the present disclosure provide apparatus, methods, processing systems, and computer readable mediums for beam management between two or more user equipment (UEs). In some aspects, the disclosure is directed to methods and techniques for performing various beam management procedures (e.g., P1, P2, and P3 procedures) on a sidelink communication between two or more UEs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. U IRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations 110 and other network entities. A base station may be a station that communicates with user equipment (UE). Each base station 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and base station, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile base station. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A base station for a macro cell may be referred to as a macro base station. A base station for a pico cell may be referred to as a pico base station. A base station for a femto cell may be referred to as a femto base station or a home base station. In the example shown in FIG. 1, the base stations 110a, 110b and 110c may be macro base stations for the macro cells 102a, 102b and 102c, respectively. The base station 110x may be a pico base station for a pico cell 102x. The base stations 110y and 110z may be femto base stations for the femto cells 102y and 102z, respectively. A base station may support one or multiple (e.g., three) cells.

Wireless communication network 100 may also include relay stations. A relay station is a station that receives a transmission of data and/or other information from an upstream station (e.g., a base station or a UE) and sends a transmission of the data and/or other information to a downstream station (e.g., a UE or a base station). A relay station may also be a UE that relays transmissions for other UEs. In the example shown in FIG. 1, a relay station 110r may communicate with the base station 110a and a UE 120r in order to facilitate communication between the base station 110a and the UE 120r. A relay station may also be referred to as a relay base station, a relay, etc.

Wireless communication network 100 may be a heterogeneous network that includes base stations of different types, e.g., macro base station, pico base station, femto base station, relays, etc. These different types of base stations may have different transmit power levels, different coverage areas, and different impact on interference in the wireless communication network 100. For example, macro base station may have a high transmit power level (e.g., 20 Watts) whereas pico base station, femto base station, and relays may have a lower transmit power level (e.g., 1 Watt).

Wireless communication network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for both synchronous and asynchronous operation.

A network controller 130 may couple to a set of base stations and provide coordination and control for these base stations. The network controller 130 may communicate with the base stations 110 via a backhaul. The base stations 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, vehicle to everything (V2X) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or base station), even though the scheduling entity may be utilized for scheduling and/or control purposes. In some examples, the sidelink signals may be communicated using a licensed spectrum (unlike wireless local area networks, which typically use an unlicensed spectrum).

In some examples of the wireless communication network 100, sidelink signals may be used between UEs without necessarily relying on scheduling or control information from a base station. For example, two or more UEs (e.g., UEs 122 and 124) may communicate with each other using peer to peer (P2P) or sidelink signals 126 without relaying that communication through a base station (e.g., base station 110a). In a further example, UE 132 is illustrated communicating with UE 134 outside of cell 102a coverage. Any of the UEs (122, 124, 132, 134) may function as a scheduling entity or a primary sidelink device, while the other UE may function as a subordinate entity or a non-primary (e.g., secondary) sidelink device. Further, the UEs (122, 124, 132, 134) may be configured to perform beam management procedures for a sidelink as described throughout the disclosure. Accordingly, one or more of the UEs may function as a scheduling entity in a device-to-device (D2D), peer-topeer (P2P), or vehicle-to-vehicle (V2V) network, and/or in a mesh network to initiate and/or schedule certain beam management procedures.

In FIG. 1, a solid line with double arrows indicates desired transmissions between a UE and a serving base station designated to serve the UE on the downlink and/or uplink, or between a UE and a UE in a D2D communication (e.g., sidelink). A finely dashed line with double arrows indicates potentially interfering transmissions between a UE and a base station. Thus, in a wireless communication system with scheduled access to time-frequency resources and having a cellular configuration, a P2P configuration, or a mesh configuration, a base station and one or more UEs may communicate utilizing the scheduled resources.

Figure 2:
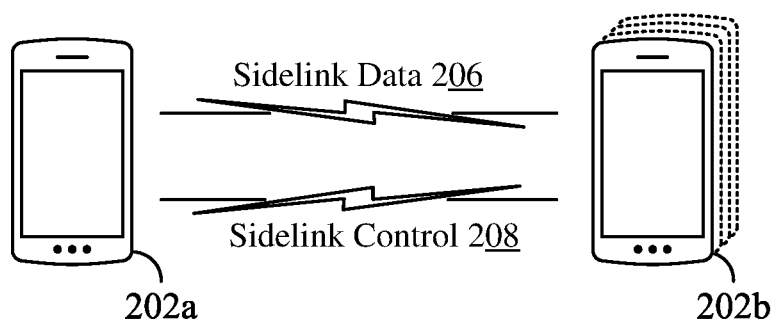
FIG. 2 is a diagram conceptually illustrating an example of a first user equipment (UE) communicating with one or more other UEs in a sidelink communication in accordance with certain aspects of the present disclosure.

FIG. 2 is a diagram conceptually illustrating a sidelink communication between a first UE 202a and one or more second UEs 202b (collectively, "second UE 202b"). In various examples, any one of the first UE 202a and the second UE 202b may correspond to a UE or other suitable node in the wireless communication network 100. For example, any one of the first UE 202a and the second UE 202b may correspond to UE 122, 124, 132, and/or 134.

In some examples, the first UE 202a and the second UE 202b may utilize sidelink signals for direct D2D communication. Sidelink signals may include sidelink data 206 (i.e., sidelink traffic) and sidelink control information 208. Broadly, the first UE 202a and one or more a second UEs 202b may communicate sidelink data 206 and sidelink control information 208 using one or more data channels and control channels. In some aspects, data channels include a physical sidelink shared channel (PSSCH) and/or sidelink shared channel (SL-SCH). In some aspects, control channels include a physical sidelink control channel (PSCCH) and/or physical sidelink feedback channel (PSFCH).

Sidelink control information 208 may include a source transmit signal (STS), a direction selection signal (DSS), and a destination receive signal (DRS). The DSS/STS may provide for a UE 202 (e.g., 202a, 202b) to request a duration of time to keep a sidelink channel available for a sidelink signal; and the DRS may provide for the UE 202 to indicate the availability of the sidelink channel, e.g., for a requested duration of time. Accordingly, the first UE 202a and the second UE 202b may negotiate the availability and use of sidelink channel resources prior to communication of sidelink data 206 information.

In some configurations, any one or more of the first UE 202a or the second UE 202b may be responsible for initiating and/or scheduling traffic in a D2D communication, including the communication of sidelink data 206 and sidelink control information 208, and maintenance of the sidelink communication channel(s). For example, the first UE 202a may be responsible for scheduling and/or initiating beam management procedures (e.g., initial beam selection procedures, beam sweeping procedures, beam refinement procedures, etc.) between the first UE 202a and the second UE 202b, as disclosed herein. In this example, the second UE 202b receives scheduling control information, including but not limited to beam management scheduling information, synchronization or timing information, or other control information.

The channels or carriers illustrated in FIG. 2 are not necessarily all of the channels or carriers that may be utilized between a first UE 202a and a second UE 202b in a sidelink communication, and those of ordinary skill in the art will recognize that other channels or carriers may be utilized in addition to those illustrated, such as other data, control, and feedback channels.

Figure 3:
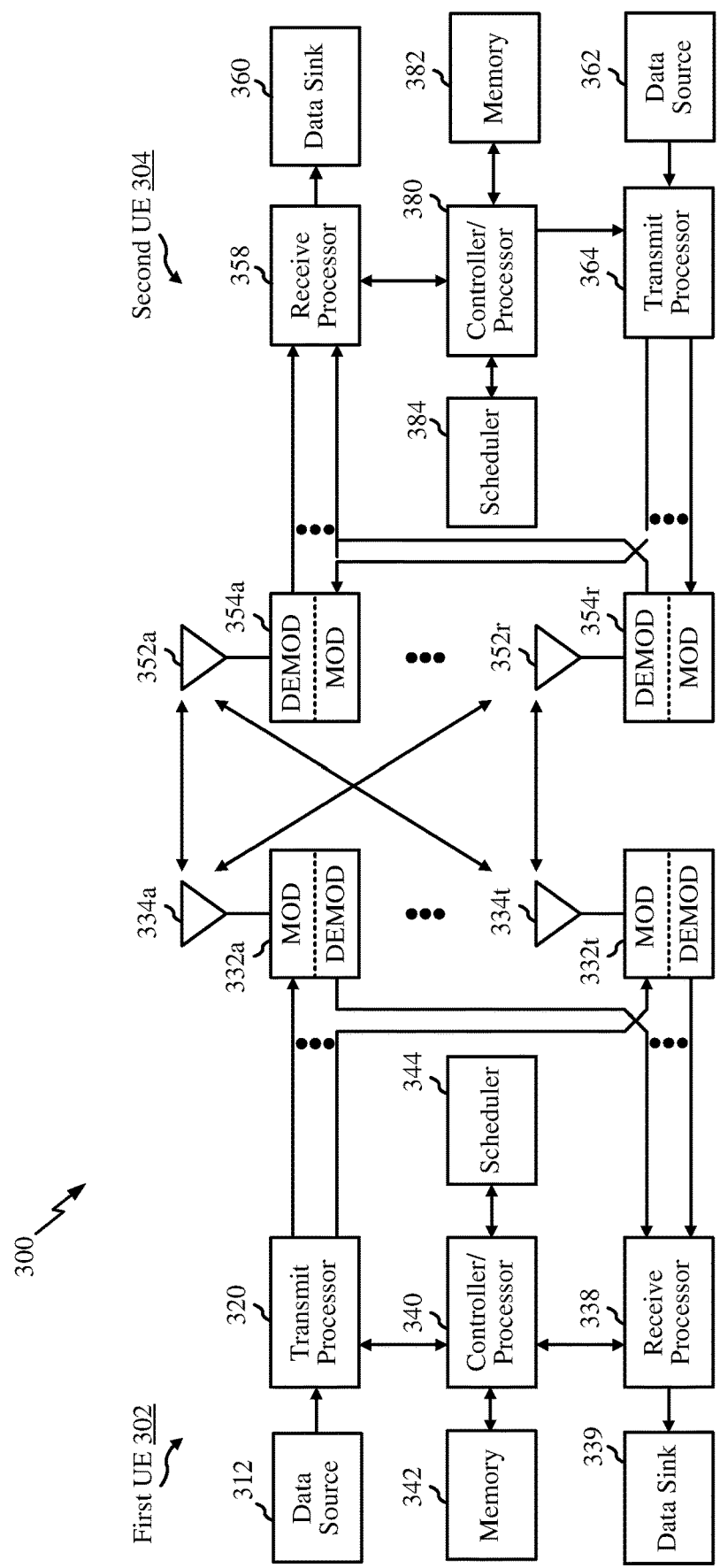
FIG. 3 is a block diagram conceptually illustrating a design of an example first UE and second UE, in accordance with certain aspects of the present disclosure.

FIG. 3 illustrates example components of a first UE 302 and a second UE 304, which may be used to implement aspects of the present disclosure. For example, antennas 352, processors 358, 364, and/or controller/processor 380 of the first UE 302 and/or antennas 334, processors 320, 338, and/or controller/processor 340 of the second UE 304 may be used to perform the various techniques and methods described herein. In various examples, any one of the first UE 302 and the second UE 304 may correspond to a UE or other suitable node in the wireless communication network 100. For example, any of the first UE 302 and the second UE 304 may correspond to UE 122, 124, 132, and/or 134.

According to some aspects, a transmit processor 320 at the first UE 302 may receive data from a data source 312 and control information from a controller/processor 340. The control information may be for a physical sidelink broadcast channel (PSBCH) or a physical sidelink control channel (PSCCH). The data may be for the physical sidelink shared channel (PSSCH), etc. The processor 320 may process (e.g., encode and symbol map) the data and control information to obtain data symbols and control symbols, respectively. The transmit processor 320 may also generate reference symbols, such as for the primary synchronization signal (PSS), secondary synchronization signal (SSS), and cell-specific reference signal (CRS), and may provide output symbol streams to the modulators (MODs) 332a-332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a signal. Signals from modulators 332a-332t may be transmitted via the antennas 334a-334t, respectively.

At the second UE 304, the antennas 352a-352r may receive the transmitted signals from the first UE 302 and may provide the received signals to the demodulators (DEMODs) in transceivers 354a-354r, respectively. Each demodulator 354 may condition (e.g., filter, amplify, downconvert, and digitize) a respective received signal to obtain input samples. Each demodulator may further process the input samples (e.g., for OFDM, etc.) to obtain received symbols. A receive processor 358 may obtain received symbols from all the demodulators 354a-354r, process (e.g., demodulate, deinterleave, and decode) the detected symbols, provide decoded data for the second UE 304 to a data sink 360, and provide decoded control information to a controller/processor 380.

At the second UE 304, a transmit processor 364 may receive and process data (e.g., for the PSSCH) from a data source 362 and control information (e.g., for the PSCCH) from the controller/processor 380. The transmit processor 364 may also generate reference symbols for a reference signal (e.g., for the sounding reference signal (SRS)). The symbols from the transmit processor 364 may be processed by the demodulators in transceivers 354a-354r (e.g., for SC-FDM, etc.), and transmitted to the first UE 302. At the first UE 302, signals from the second UE 304 may be received by the antennas 334, processed by the modulators 332, and further processed by a receive processor 338 to obtain decoded data and control information sent by the second UE 304. The receive processor 338 may provide the decoded data to a data sink 339 and the decoded control information to the controller/processor 340.

In some aspects, the first UE 302 and the second UE 304 include multiple antennas (334a through 334t and 352a through 352r) configured for beamforming. That is the first UE 302 and the second UE 304 may be configured for directional signal transmission or reception. For a beamformed transmission, the amplitude and phase of each antenna in an array of antennas may be precoded, or controlled to create a desired (e.g., directional) pattern of constructive and destructive interference in the wavefront. The use of such multiple antenna technology enables the wireless communication system to exploit the spatial domain to support spatial multiplexing and transmit diversity.

The controllers/processors 340 and 380 may direct the operation at the first UE 302 and the second UE 304, respectively. The controller/processor 340 and/or other processors and modules at the first UE 302 may perform or direct the execution of processes for the techniques described herein such as beam management (e.g., initial beam selection procedures, beam sweeping procedures, beam refinement procedures, etc.). The memories 342 and 382 may store data and program codes for first UE 302 and the second UE 304, respectively. The schedulers 344 and 384 may schedule the first UE 302 and/or the second UE 304 for transmitting and receiving data.

Figure 4:
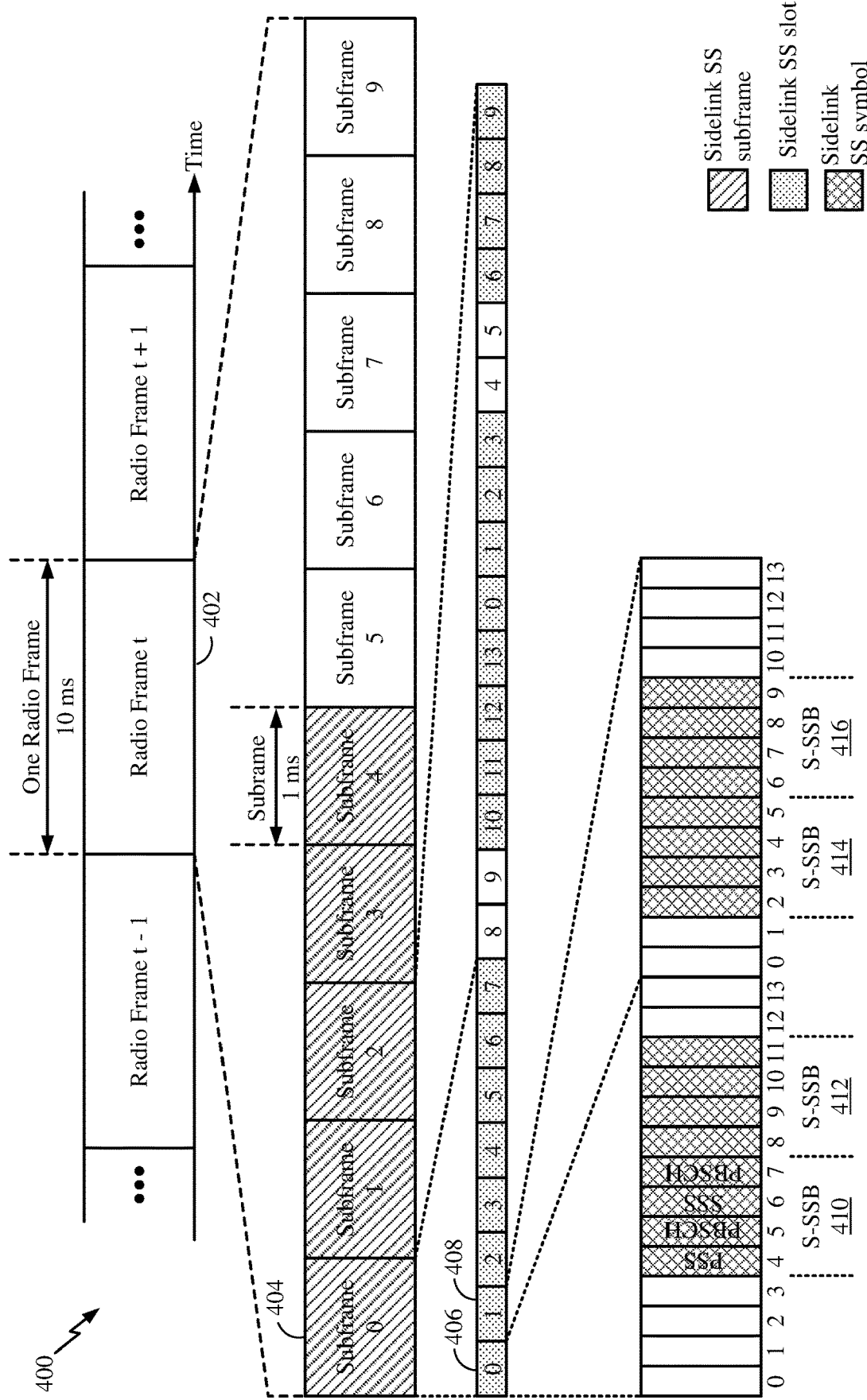
FIG. 4 is an example frame format, in accordance with certain aspects of the present disclosure.

FIG. 4 is a diagram showing an example of a frame format 400 for NR. The transmission timeline for each data transmission and reception may be partitioned into units of radio frames 402. In NR, the basic transmission time interval (TTI) may be referred to as a slot. In NR, a subframe may contain a variable number of slots (e.g., 1, 2, 4, 8, 16, . . . , N slots) depending on the subcarrier spacing (SCS). NR may support a base SCS of 15 KHz and other SCS may be defined with respect to the base SCS (e.g., 30 kHz, 60 kHz, 120 kHz, 240 kHz, etc.). In the example shown in FIG. 4, the SCS is 120 kHz. As shown in FIG. 4, the subframe 404 (subframe 0) contains 8 slots (slots 0, 1, . . . , 7) with a 0.125 ms duration. The symbol and slot lengths scale with the subcarrier spacing. Each slot may include a variable number of symbol (e.g., OFDM symbols) periods (e.g., 7 or 14 symbols) depending on the SCS. For the 120 kHz SCS shown in FIG. 4, each of the slot 406 (slot 0) and slot 408 (slot 1) includes 14 symbol periods (slots with indices 0, 1, . . . , 13) with a 0.25 ms duration.

In sidelink, a sidelink synchronization signal block (S-SSB), referred to as the SS block or SSB, is transmitted. The SSB may include a primary SS (PSS), a secondary SS (SSS), and/or a two symbol physical sidelink broadcast channel (PSBCH). In some examples, the SSB can be transmitted up to sixty-four times with up to sixty-four different beam directions. The up to sixty-four transmissions of the SSB are referred to as the SS burst set. SSBs in an SS burst set may be transmitted in the same frequency region, while SSBs in different SS bursts sets can be transmitted in different frequency regions.

In the example shown in FIG. 4, in the subframe 404, SSB is transmitted in each of the slots (slots 0, 1, . . . , 7). In the example shown in FIG. 4, in the slot 406 (slot 0), an SSB 410 is transmitted in the symbols 4, 5, 6, 7 and an SSB 412 is transmitted in the symbols 8, 9, 10, 11, and in the slot 408 (slot 1), an SSB 414 is transmitted in the symbols 2, 3, 4, 5 and an SSB 416 is transmitted in the symbols 6, 7, 8, 9, and so on. The SSB may include a primary SS (PSS), a secondary (SSS), and a two symbol physical sidelink broadcast channel (PSBCH). The PSS and SSS may be used by UEs to establish sidelink communication (e.g., transmission and/or reception of data and/or control channels). The PSS may provide half-frame timing, the SS may provide cyclic prefix (CP) length and frame timing. The PBSCH carries some basic system information, such as system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), and other system information (OSI) can be transmitted on a physical sidelink shared channel (PSSCH) in certain subframes.

Sidelink P1 Procedure

In 5G NR, the beam management procedure for determining a beam pair link may be referred to as a P1 procedure. As described herein, one or more UEs may use certain beam management procedures to overcome pathlosses and to enhance link budget/signal to noise ratio (SNR) over sidelink channels. Beam management may refer to discovering, establishing, and/or refining a sidelink between two UEs, such as a first UE and a second UE.

Figure 5:
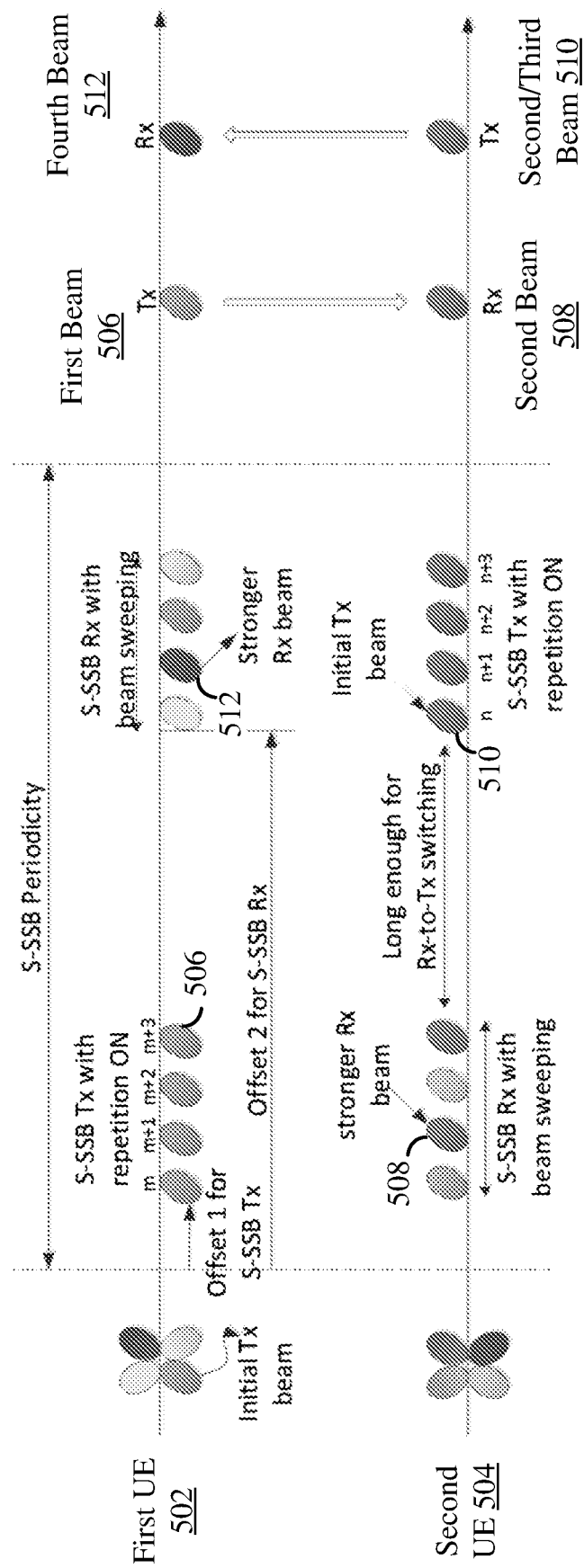
FIG. 5 is a process flow conceptually illustrating an example of a P1 procedure for beam management, in accordance with certain aspects of the present disclosure.

FIG. 5 illustrates an example P1 procedure according to certain aspects of the disclosure. A first UE 502 may select a first beam 506 (a transmit beam) for transmission of a first signal used for beam management of a sidelink between the first UE 502 and a second UE 504. In one example, the first UE 502 randomly selects the first beam 506 from a plurality of beams having different spatial directions such that the plurality of beams cover several spatial locations surrounding the first UE 502. In another example, the first UE 502 selects the first beam 506 from one or more beams corresponding to (e.g. used for) a sidelink resource (e.g., communication of a reference signal) of the first UE 502. The correspondence between the sidelink resource and the initial selected first beam 506 may be predetermined as defined by 3GPP and/or configured by the network (e.g., base station 110). In another example, the first UE 502 may select the first beam 506 from a plurality of beams based on a sounding reference signal (SRS) received from the second UE (i.e., the first UE 502 selects the first beam 506 based on the beam that received the SRS).

The first UE 502 may transmit the first signal in a plurality of transmissions, wherein each of the plurality of transmissions is transmitted via the selected first beam 506 according to a first periodic interval. For example, the first signal may be transmitted by the first beam 506 at time m, m+1, m+2, m+3, etc. The first signal is configured to provide the second UE 504 with a basis for selecting, from a plurality of beams, a second beam 508 (a receive beam) for receiving data on the sidelink. In this example, the second UE 504 may utilize a plurality of receive beams to receive one or more of the plurality of transmissions of the first signal, and measure each received transmission of the first signal corresponding to the receive beam used to receive the transmission. Based on the measurements, the second UE 504 may select a second beam 508 for receiving data from the first UE 502. In some cases, the selected second beam 508 corresponds to the receive beam used to receive the transmission of the first signal having the best measurement. In some examples, the best measurement may correspond to a measurement that, among the plurality of receive beams, indicates the highest received power, the highest signal quality, etc. A measurement may be, for example, a received power or received quality of the first signal such as a channel quality indicator (CQI) measurement, a reference signal received power (RSRP) measurement, a signal to noise ratio (SNR) measurement, or any other suitable signal strength or quality indicating measurement.

Once the second UE has selected the second beam 508, the second UE 504 may transmit a second signal to the first UE 502. Here, the second signal may be transmitted in a second plurality of transmissions according to a second periodic interval. For example, the second signal may be transmitted by second UE 504 at time n, n+1, n+2, n+3, etc. In some examples, the second signal is configured to provide the first UE 502 with a basis for selecting a fourth beam 512 for receiving data from the second UE 504 on the sidelink.

In one configuration, the second UE 504 may utilize a third beam 510 for making the second plurality of transmissions, wherein the third beam 510 includes the same spatial dimensions as the selected second beam 508. For example, although the third beam 510 is used for transmission of data and the second beam 508 is used for reception of data, the third beam 510 may use the same directional aspects used by the second beam 508.

In another configuration, the second UE 504 may utilize the second beam 508 for making the second plurality of transmissions. For example, if the communication on the sidelink is performed according to a time division duplex (TDD) communication protocol, then the second UE 504 may transmit and receive data over the same beam (i.e., the second beam 508). In yet another configuration, the second UE 504 randomly selects the third beam 510.

The advantage to using a third beam 510 having the same directional aspects used by the second beam 508, or using the second beam 508 for both transmission and reception, is reduced feedback required between one or more UEs in a sidelink communication. For example, the second UE 504 is not initially required to perform a beam sweep of transmission beams to determine the third beam 510. This saves time because, instead of performing a beam sweep and analyzing feedback, the transmit beams and receive beams are selected by both the first UE 502 and the second UE 504, transparent to the other UE.

The first UE 502 may utilize a plurality of receive beams to receive one or more of the plurality of transmissions of the second signal. The first UE 502 may measure each received transmission of the second signal as received using one of the plurality of receive beams. Based on the measurements, the first UE 502 may select a fourth beam 512 for receiving data transmitted by the second UE 504. In some cases, the selected fourth beam 512 corresponds to the receive beam used to receive the transmission of the second signal having the best measurement.

In some configurations, the signals communicated between the first UE 502 and the second UE 504 include S-SSBs. In other configurations, the signals communicated between the first UE 502 and the second UE include a reference signal. For example, the signal may be a sounding reference signal (SRS), a demodulation reference signal (DMRS), a channel state information reference signal (CSI-RS), a beam management reference signal (BM-RS). In some examples, the BM-RS includes a reference signal configured for sidelink beam management between the first UE and the second UE.

For example, without S-SSB, the first UE 502 and the second UE 504 may transmit/receive periodic reference signals over the beams to establish an initial link. In some configurations, the reference signals may be periodic reference signals, where the periodicity and time-frequency resources may be based on one or more of a sidelink resource of the UE (e.g., 502, 504), or system information broadcast by the UE.

In some configurations, the first UE 502 and the second UE 504 may be configured to broadcast synchronization signals (e.g., PSS, SSS, and PSBCH). The UEs (502, 504) may receive the synchronization signals, and derive carrier frequency and slot timing from the synchronization signals. For example, the synchronization signals may include timing information based on one or more of a satellite (e.g., a global positioning satellite (GPS) (e.g., the United States global navigation satellite system (GNSS), the Russian GLONASS, the Chinese BeiDou Navigation Satellite System (BDS), or the European Union's Galileo satellite)), a network (e.g., communicated by a base station 110 in FIG. 1 via a radio resource control (RRC) message, a medium access control-control element (MAC-CE), downlink control information (DCI), etc.), or a timing device (e.g., a local clock, a remote clock in communication with the UEs via Wi-Fi, Bluetooth, etc.). Accordingly, the first UE 502 and the second UE 504 may synchronize their timing or internal clock systems to a common reference time for performing one or more of the beam management procedures disclosed herein.

In some examples, one or more of the first UE 502 or the second UE 504 may determine a first starting time for transmitting the first signal by the first UE 502. In some examples, one or more of the first UE 502 or the second UE 504 may determine a second starting time for transmitting, by the second UE 504, the second signal. In some examples, the first starting time and the second starting time are based on one or more of: a network configuration communicated to the first UE 502 and/or second UE 504 via the network, a sidelink resource of the first UE, or a periodic global positioning system (GPS) signal.

Sidelink P2 Procedure

Figure 6A:
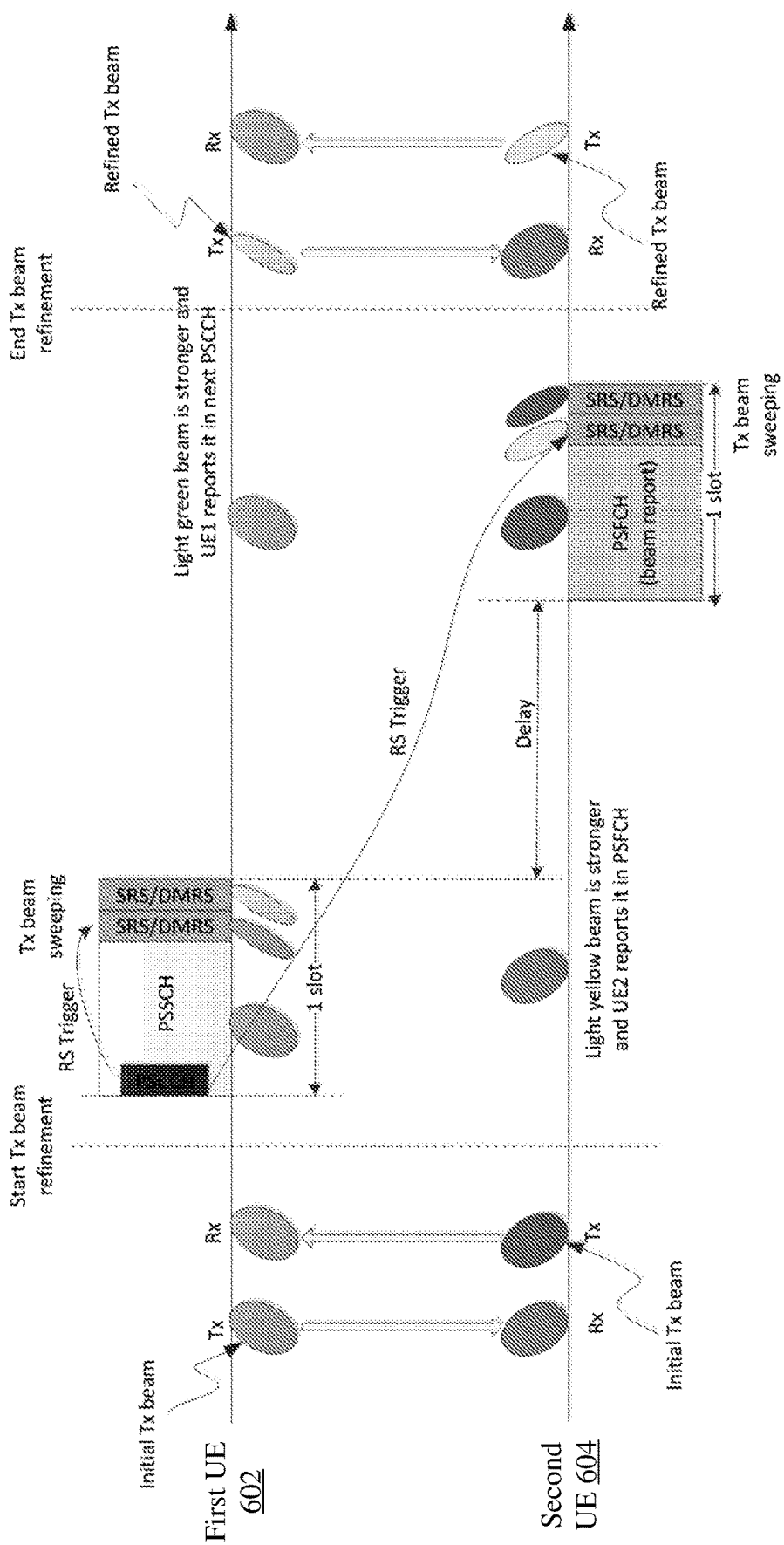
FIGS. 6A-6C are process flows conceptually illustrating examples of P2 procedures for beam management, in accordance with certain aspects of the present disclosure.
Figure 6B:
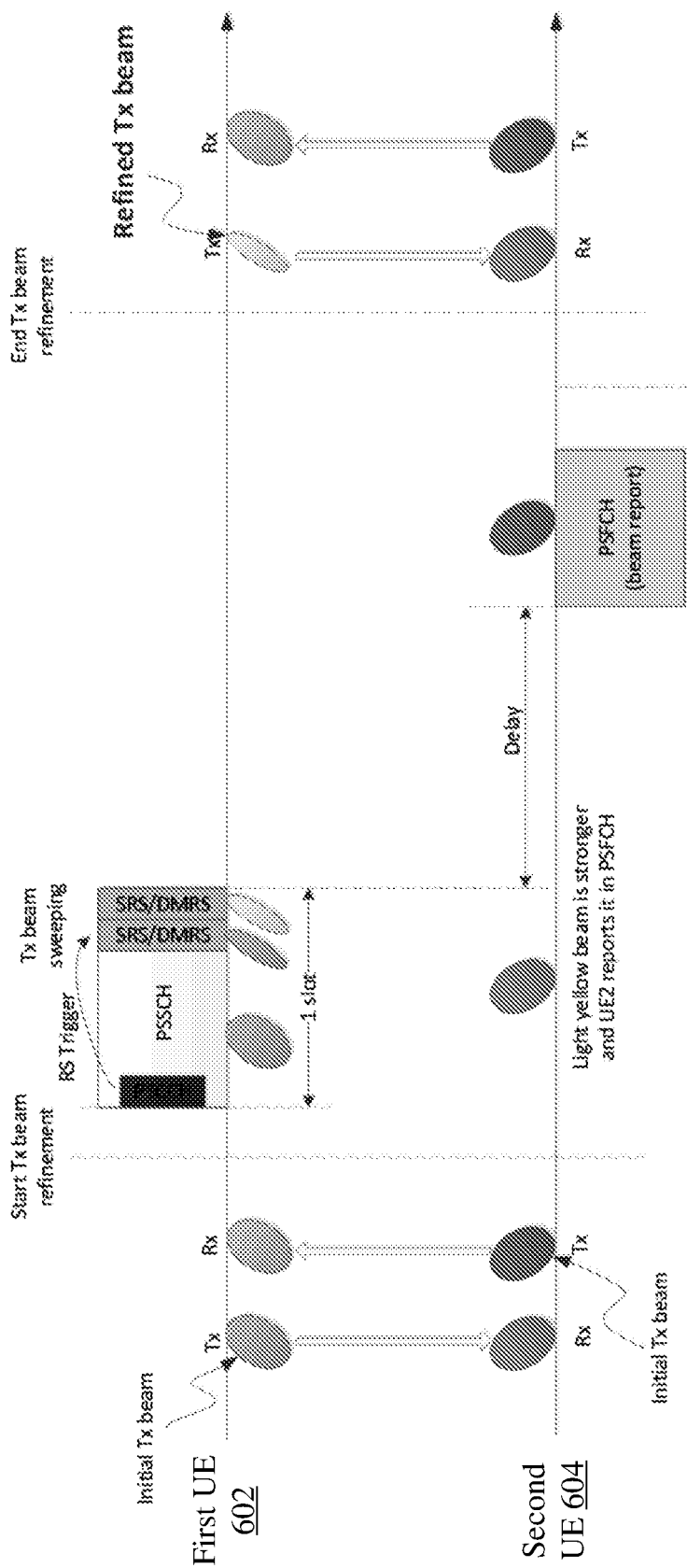
Figure 6C:
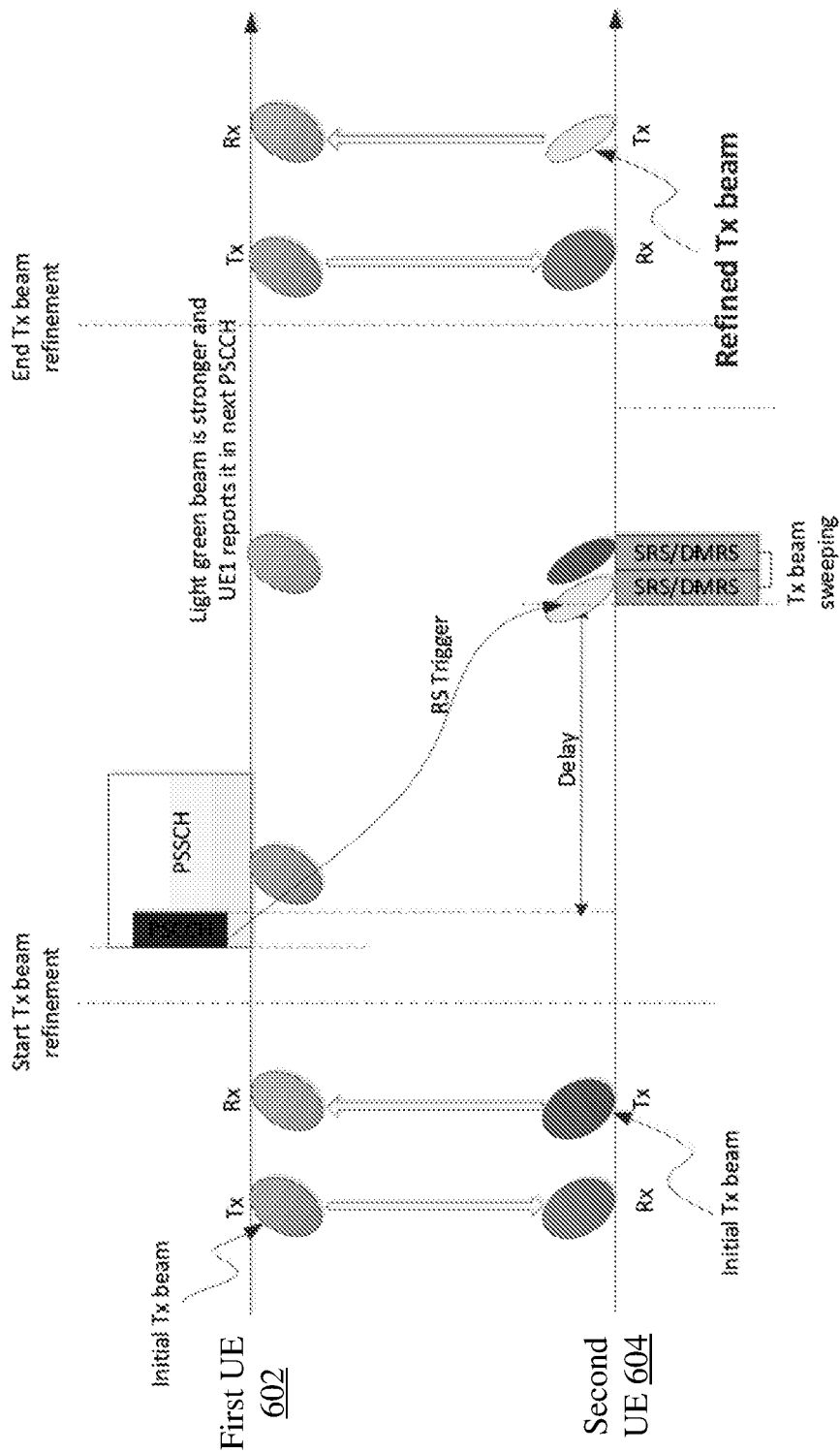

In 5G NR, the beam management procedures for beam refinement of beam pairs may be referred to as the P2 and P3 procedures. FIGS. 6A, 6B, and 6C illustrate example P2 procedures. It should be noted that each of the P1, P2, and P3 procedures as described herein may be used in conjunction to perform beam management. Further, in certain embodiments, one or more of the P1, P2, and P3 procedures as described herein may be used with other P1, P2, or P3 procedures than those described herein.

In a first example of the P2 procedure, a first UE 602 may transmit a message configured to initiate a beam sweeping operation for beam management of a sidelink between the first UE 602 and the second UE 604. That is, the first UE 602 transmits the message to the second UE 604 via a physical sidelink control channel (PSCCH) established over the sidelink. The message may be transmitted via one or more slots in the PSCCH. In one aspect of the first example, the first UE 602 may be the first and only UE to perform a beam sweep of transmit beams (for example, see FIG. 6B). Alternatively, the first UE 602 may be the first to perform the beam sweep of transmit beams, followed by a beam sweep of transmit beams by the second UE 604 (for example, see FIG. 6A).

In some configurations, the beam sweeping operation includes transmitting, by the first UE 602, a first plurality of signals, wherein each signal of the first plurality of signals is transmitted to the second UE 604 via one of a first plurality of beams (transmit beams). Accordingly, each of the first plurality of signals is associated with one of the first plurality of beams. In some examples, each of the first plurality of beams are based on an initial beam previously established by the first UE 602 in the sidelink communication with the second UE 604. For example, each of the first plurality of beams may be spatially related to the initial beam (e.g., same or similar direction), and/or may include a plurality of narrower beams over the spatial area of the initial beam. For example, the initial beam may correspond to a beam selected by the first UE 502, and used to transmit data in the P1 procedure described above.

The second UE 604 receives the first plurality of signals transmitted on the first plurality of beams from the first UE 602 using a previously established receive beam. In some examples, the previously established receive beam may correspond to a beam selected by the second UE 504, and used to receive data in the P1 procedure described above. The first plurality of signals are configured to provide the second UE 604 with a basis for measuring (e.g., signal power, signal quality, etc.) each of the first plurality of beams. For example, the second UE 604 may determine a received power or received quality of the first signal such as a CQI, an RSRP, an SNR, or any other suitable signal strength or quality indicating measurement of each of the plurality of signals received, and determine which one of the first plurality of signals has a suitable (e.g., highest) measurement. The second UE may then select a first preferred beam from the first plurality of beams as the beam associated with the signal having the suitable SNR. In some examples, each of the first plurality of signals is transmitted in the same slot comprising the message configured to initiate a beam sweeping operation for beam management of a sidelink between the first UE 602 and the second UE 604.

After selecting the first preferred beam, the second UE 604 may generate a first report for transmission to the first UE 602, indicating the first preferred beam. In some examples, the first preferred beam is selected from the first plurality of beams based on its SNR, or other measure of the signal. The second UE 604 may transmit the first report to the first UE 602. In some examples, the first UE 602 receives the first report and, based on the indication of the first preferred beam, switches from the initial beam previously used by the first UE 602 to the first preferred beam for transmission.

In one configuration, the first report is communicated via one or more scheduled resources of physical sidelink feedback channel (PSFCH) identified in the message configured to initiate the beam sweeping operation, or in another communication (e.g., transmission and/or reception of data and/or control channels) between the UEs. In some examples, the first report is communicated over one or more resources of the PSCCH.

In some configurations, the message configured to initiate the beam sweeping operation also provides a time delay between resources used for transmission of the first plurality of signals and resources used for the first report. For example, the first UE 602 may determine the time delay to provide the second UE 604 with enough time to calculate SNRs, or other measures, for the first plurality of beams. In some configurations, the message configured to initiate the beam sweeping operation is further configured to indicate a time delay between the message and the resources used for transmission of the first plurality of signals. Here, the first UE 602 may determine the time delay to provide the second UE 604 with enough time to prepare for the beam sweeping operation.

In some configurations, the beam sweeping operation includes receiving, by the first UE 602, a second plurality of signals in response to the message and after receiving the first report. That is, the second UE 604 is configured to transmit the second plurality of signals after transmitting the first report. The second plurality of signals may be configured to provide the first UE 602 with a basis for measuring signal quality at one or more of a second plurality of beams. For example, the first UE 604 may determine a received power or received quality of the first signal such as a CQI, an RSRP, an SNR, or any other suitable signal strength or quality indicating measurement of each of the signals received, and determine which one of the first plurality of signals has a suitable (e.g., highest) measurement. In some examples, the second UE 604 delays transmission of the second plurality of signals for a period of time after transmitting the first report. For example, the first UE 602 or the second UE 604 may provide an indication of the delay in the message, or in another communication.

The second UE 604 is configured to transmit each signal of the second plurality of signals via one of the second plurality of beams based on an initial beam previously used by the second UE 604. That is, the first UE 602 is configured to receive one or more of the second plurality of signals, with each signal being transmitted to the first UE 602 using one of the second plurality of beams. For example, each of the second plurality of beams may be spatially related to the initial beam (e.g., same or similar direction), and/or may include a plurality of narrower beams over the spatial area of the initial beam. In some examples, the initial beam may correspond to a beam selected by the second UE 504, and used to transmit data in the P1 procedure described above.

The first UE 602 may measure each received transmission of the second plurality of signals to determine a second preferred beam from the second plurality of beams. In some examples, the determination is based on signal power and/or signal quality measured at one or more of the second plurality of beams. The first UE 602 may then select the second preferred beam from the second plurality of beams as the beam based on signal power and/or signal quality (e.g., the beam associated with the signal having the suitable SNR). In some examples, the first UE 602 may generate and transmit a second report indicating the second preferred beam to the second UE 604. In some examples, the second report is transmitted using one or more PSCCH resources, or one or more scheduled PSFCH resources identified in the message and/or based on a sidelink resource of the first UE 602. For example, the second report may be transmitted using a sidelink resource of the first UE 602 indicated by 3GPP and/or configured by the network (e.g., base station 110).

In some configurations, each of the second plurality of signals is transmitted in the same slot that contains the message configured to initiate the beam sweeping operation between the first UE 602 and a second UE 604. In other configurations, the message configured to initiate the beam sweeping operation is further configured to indicate a time delay between the message and the resources used for transmission of the second plurality of signals In a second example of the P2 procedure, the first UE 602 may transmit a message configured to initiate the beam sweeping operation between the first UE 602 and the second UE 604. In one aspect of this example, the second UE 604 may be the first and only UE to perform a beam sweep of transmit beams (for example, see FIG. 6C). Alternatively, the second UE 604 may be the first to perform the beam sweep of transmit beams, followed by a beam sweep of transmit beams by the first UE 602.

In the second example, the beam sweeping operation includes receiving, by the first UE 602, a first plurality of signals in response to the message configured to initiate the beam sweeping operation. Each signal of the first plurality of signals is transmitted via one of a first plurality of beams based on an initial beam previously used by the second UE 604. That is, the second UE 604 transmits the first plurality of signals over a first plurality of transmit beams that are based on a transmit beam determined, for example, at the P1 procedure discussed above. For example, each of the first plurality of beams may be spatially related to the initial beam (e.g., same or similar direction), and/or may include a plurality of narrower beams over the spatial area of the initial beam. For example, the initial beam may correspond to a beam selected by the first UE 602, and used to transmit data in the P1 procedure described above. The first plurality of signals are configured to provide the first UE 602 with a basis for measuring signal quality at each of the first plurality of beams.

In some configurations, the first UE 602 determines a first preferred beam from the first plurality of beams based on signal quality measured at one or more of the first plurality of beams. The first UE 602 may then select the first preferred beam as the beam associated with the signal having suitable measurement (e.g., SNR). After selecting the first preferred beam, the first UE 602 may generate a first report indicating selection of the first preferred beam to the second UE 604, and transmit the first report to the second UE 604. In response to the first report, the second UE 604 may switch from the initial transmit beam previously used by the second UE to the first preferred beam.

In some configurations, the first UE 602 may transmit a second plurality of signals after transmitting the first report, wherein each signal of the second plurality of signals is transmitted to the second UE 604 via one of a second plurality of beams based on an initial beam previously used by the first UE 602. For example, each of the second plurality of beams may be spatially related to the initial beam (e.g., same or similar direction), and/or may include a plurality of narrower beams over the spatial area of the initial beam. For example, the initial beam may correspond to a beam selected by the first UE 602, and used to transmit data in the P1 procedure described above. The second plurality of signals are configured to provide the second UE 604 with a basis for measuring signal quality at each of the second plurality of beams. In some configurations, each of the second plurality of signals and/or first plurality of signals are transmitted in the same slot comprising the message configured to initiate a beam sweeping operation for beam management of a sidelink between the first UE 602 and a second UE 604.

In response to the second plurality of signals, the second UE 604 may measure and provide a second report to the first UE 602. In some examples, the report is transmitted using one or more PSCCH resources, or one or more scheduled PSFCH resources identified in the message. The second report may indicate a second preferred beam of the second plurality of beams. In response to the second report, the first UE 602 may switch from the initial transmit beam previously used by the first UE to the second preferred beam.

Sidelink P3 Procedure

Figure 7:
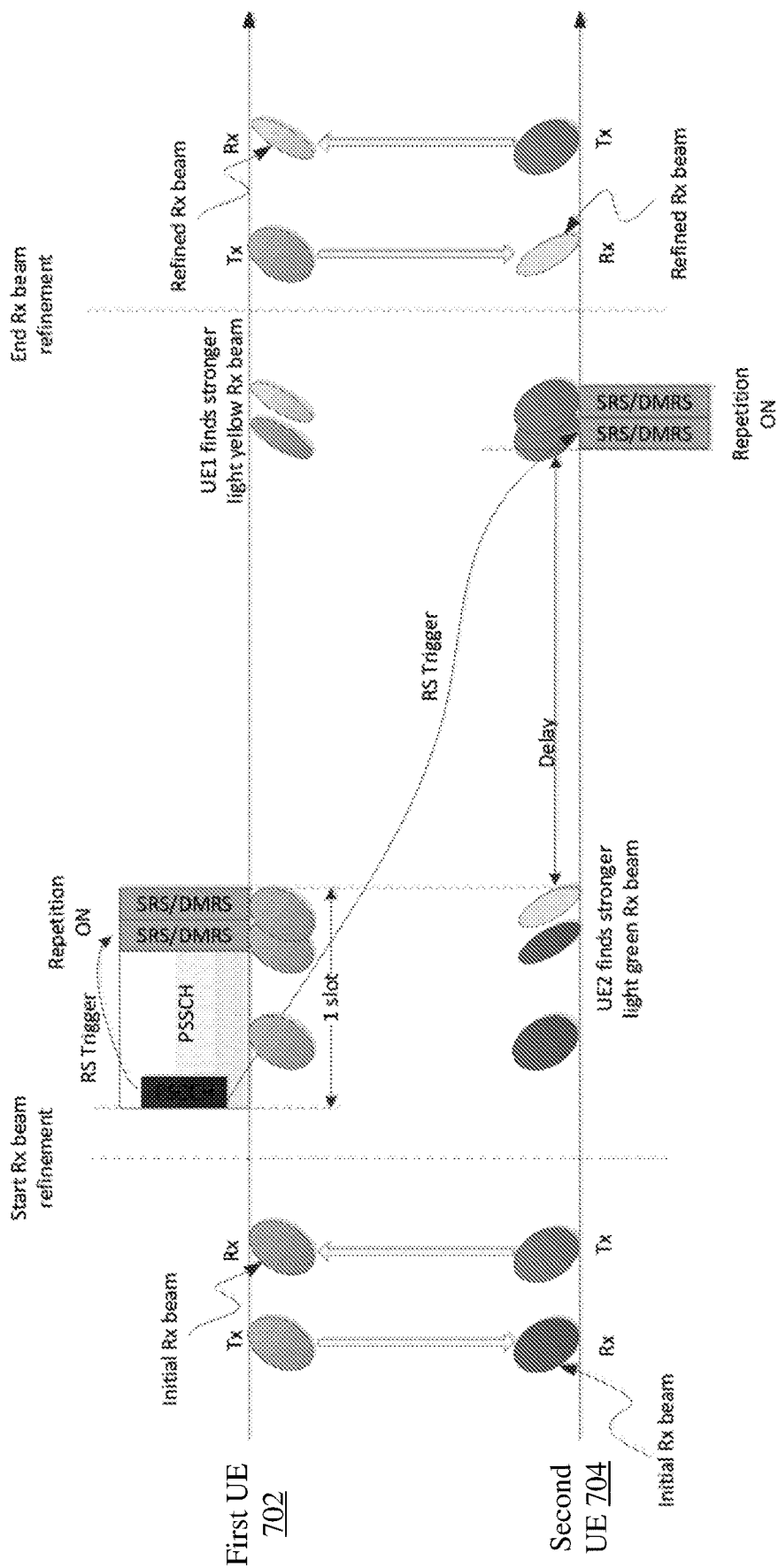
FIG. 7 is a process flow conceptually illustrating an example of a P3 procedure for beam management, in accordance with certain aspects of the present disclosure.

In 5G NR, the beam management procedures for beam refinement of a receive-beam may be referred to as P3 procedures. FIG. 7 illustrates an example of P3 procedures. It should be noted that aspects of the P3 procedure described below may include various aspects of the P1 and P2 procedures described above. In a non-limiting example, one or more of the first UE and the second UE may utilize the synchronization techniques, signal measurement techniques, etc., described above with regard to the P1 and P2 procedures.

In a first example of the P3 procedures, a first UE 702 may transmit a message configured to initiate a receive-beam refinement operation for beam management of a sidelink between the first UE 702 and the second UE 704. In some examples, the first UE 702 transmits the message to the second UE 704 via a physical sidelink control channel (PSCCH) established over the sidelink. Accordingly, the second UE 704 may receive and decode the message for the receive-beam refinement operation. The message may be transmitted/received via one or more slots in the PSCCH. In some examples, the message is configured to indicate a time delay between a time the message is received by the second UE 704 and the resources used for transmission of a first of signal of the receive-beam refinement operation.

In some configurations, the first UE 702 begins the receive-beam refinement operation by transmitting a first signal in a first plurality of transmissions to the second UE 704. That is, the first UE 702 is configured to transmit the same signal multiple times to the second UE 704 over the same beam. In some examples, each of the first plurality of transmissions is transmitted via a beam previously used by the first UE 702 for transmitting data on the sidelink (e.g., a beam used in any of the P1 and/or P2 procedures). In some examples, the first signal is configured to provide the second UE with a basis for refining a first receive-beam previously used by the second UE 704 for receiving data through the sidelink (e.g., a receive-beam used in any of the P1 and/or P2 procedures). For example, refining a beam may include finding a relatively narrower beam compared to the initial beam (e.g., first receive beam) configured during communication establishment. In some cases, refining the receive-beam may include using a plurality of narrower beams that are components (e.g., within the same range of angular direction, within the same spatial range, etc.) of the relatively wider initial beam (e.g., the first receive-beam). In some cases, the narrower beams provide higher levels of gain than a relatively broader beam, and have more defined direction than the initial beam resulting in reduced noise interference. In some examples, the first signal is transmitted in the first plurality of transmissions within the same slot comprising the message configured to initiate the receive-beam refinement operation.

In some configurations, the first UE 702 receives, from the second UE, a second signal transmitted in a second plurality of transmissions in response to the message and after transmitting the first signal. In some examples, each of the second plurality of transmissions is transmitted via a transmit-beam previously used by the second UE 704 for transmitting data on the sidelink (e.g., a beam used in any of the P1 and/or P2 procedures). In some examples, the second signal is configured to provide the first UE 702 with a basis for refining a first receive-beam previously used by the first UE 702 for receiving data through the sidelink (e.g., a beam used in any of the P1 and/or P2 procedures). The first UE 702 may determine a second receive-beam from a plurality of receive-beams based on a quality of the second signal measured at each of the plurality of receive-beams. That is, the first UE 702 may use multiple receive-beams based on the previously used beam to determine which receive-beam provides the best signal quality. In some examples, the best measurement may correspond to a measurement that, among the plurality of receive beams, indicates the highest received power, the highest signal quality, etc. A measurement may be, for example, a received power or received quality of the first signal such as a channel quality indicator (CQI) measurement, a reference signal received power (RSRP) measurement, a signal to noise ratio (SNR) measurement, or any other suitable signal strength or quality indicating measurement.

In some examples, the message configured to initiate the receive-beam refining operation is further configured to indicate a time delay between resources used for transmitting the first signal in the first plurality of transmissions and resources used for transmitting the second signal in the second plurality of transmissions.

In the first example described above, the first UE 702 may be the first and only UE to perform a receive-beam refinement operation (e.g., the first UE 702 transmits a first signal multiple times over the same beam for the second UE 704 to use for receive-beam refinement). Alternatively, the first UE 602 may be the first to perform the receive-beam refinement operation, followed by another receive-beam refinement operation performed by the second UE 604 (e.g., the second UE 704 transmits a first signal multiple times over the same beam for the first UE 702 to use for receive-beam refinement).

However, in a second example, the second UE 704 may be the first and only UE to perform a receive-beam refinement operation (e.g., the second UE 704 transmits a first signal multiple times over the same beam for the first UE 702 to use for receive-beam refinement), or alternatively, the second UE 704 may be the first to perform the receive-beam refinement operation, followed by another receive-beam refinement operation by the first UE 702. In other words, the order of UEs described above may vary.

For example, the first UE 702 may receive, from the second UE 704, a first signal transmitted in a first plurality of transmissions in response to the message. In some examples, each of the first plurality of transmissions is transmitted via a beam previously used by the second UE 704 for transmitting data on the sidelink (e.g., a beam used in any of the P1 and/or P2 procedures). In some examples, the first signal is configured to provide the first UE 702 with a basis for refining a first receive-beam previously used by the first UE for receiving data through the sidelink (e.g., a beam used in any of the P1 and/or P2 procedures). The first UE 702 may determine a second receive-beam from a first plurality of receive-beams based on a quality of the first signal measured at each of the first plurality of receive-beams. The first UE 702 may then switch to the second receive-beam for communication with the second UE 704 over the sidelink.

In some configurations, the first UE 702 may transmit a second signal in a second plurality of transmissions after receiving the first plurality of transmissions from the second UE 704. In some examples, each of the second plurality of transmissions is transmitted via a beam previously used by the first UE 702 for transmitting data on the sidelink (e.g., a beam used in any of the P1 and/or P2 procedures). In some configurations, the second signal is configured to provide the second UE 704 with a basis for refining a second receive-beam previously used by the second UE for receiving data through the sidelink (e.g., a beam used in any of the P1 and/or P2 procedures).

In some configurations, any of the first signals and/or second signals may include one or more of a SRS, a DMRS, or a CSI-RS, or a BM-RS. In some examples, each signal is transmitted in the same slot comprising the message configured to initiate a receive-beam refinement operation for beam management of a sidelink between the first UE and a second UE.

Figure 8:
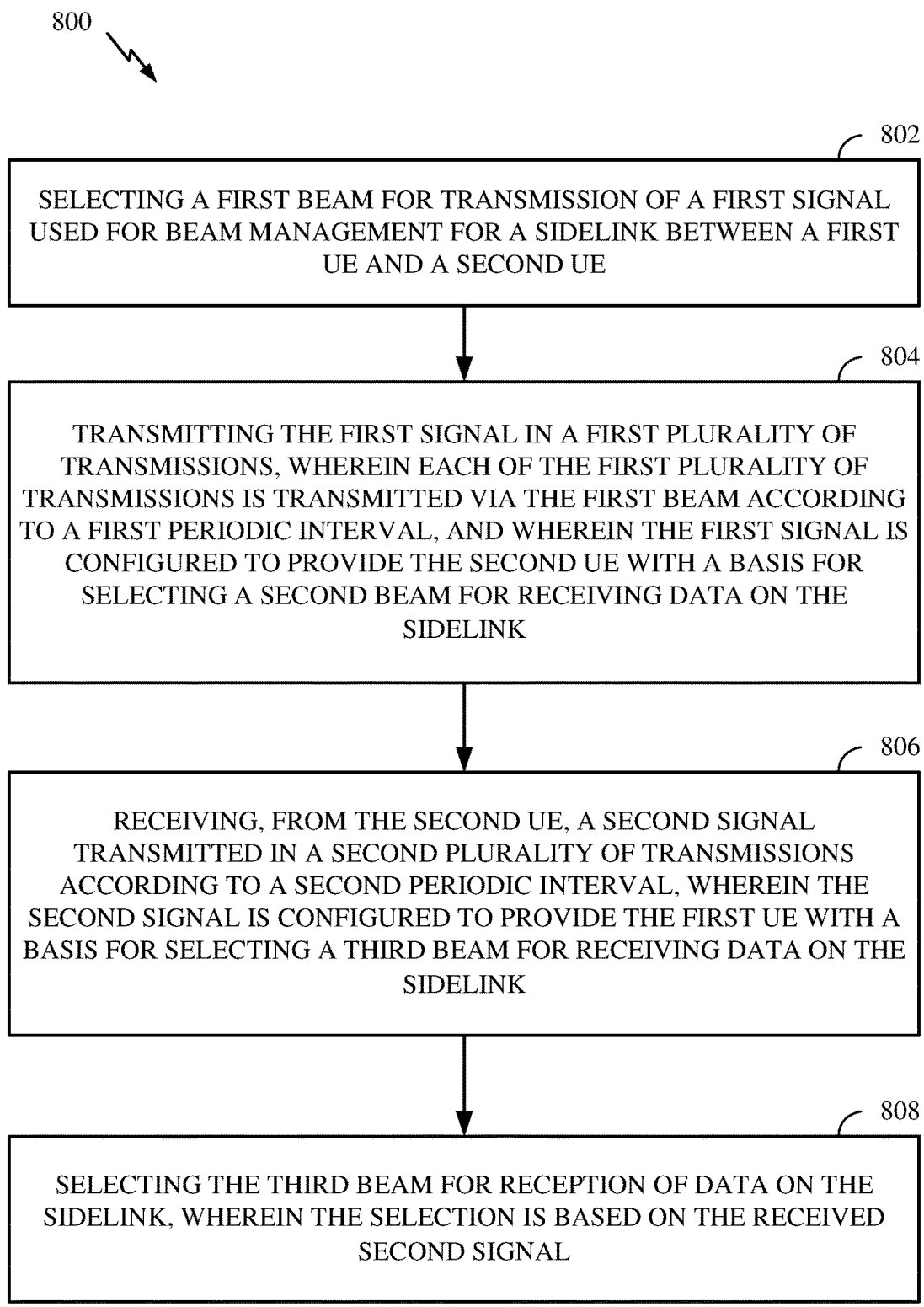
FIG. 8 is a flow diagram illustrating an example of a P1 procedure for beam management, in accordance with certain aspects of the present disclosure.

FIG. 8 is a flow diagram illustrating example operations 800 for a P1 procedure, in accordance with certain aspects of the present disclosure. The operations 800 may be performed by a UE. The UE may include any of the UEs illustrated and described in FIGS. 1-3 and 5-7. Operations 800 may be implemented as software components that are executed and run on one or more processors (e.g., controller/processor 340/380 of FIG. 3). Further, the transmission and reception of signals by the UE in operations 800 may be enabled, for example, by one or more antennas (e.g., antennas 334/352 of FIG. 3). In certain aspects, the transmission and/or reception of signals by the UE may be implemented via a bus interface of one or more processors (e.g., controller/processor 340/380) obtaining and/or outputting signals.

The operations 800 may begin, at 802, by selecting a first beam for transmission of a first signal used for beam management for a sidelink between the first UE and a second UE. At 804, the operations 800 proceed by transmitting the first signal in a first plurality of transmissions, wherein each of the first plurality of transmissions is transmitted via the first beam according to a first periodic interval, and wherein the first signal is configured to provide the second UE with a basis for selecting a second beam for receiving data on the sidelink. At 806, the operations 800 proceed by receiving, from the second UE, a second signal transmitted in a second plurality of transmissions according to a second periodic interval, wherein the second signal is configured to provide the first UE with a basis for selecting a third beam for receiving data on the sidelink. At 808, the operations 800 proceed by selecting the third beam for reception of data on the sidelink, wherein the selection is based on the received second signal.

Figure 9:
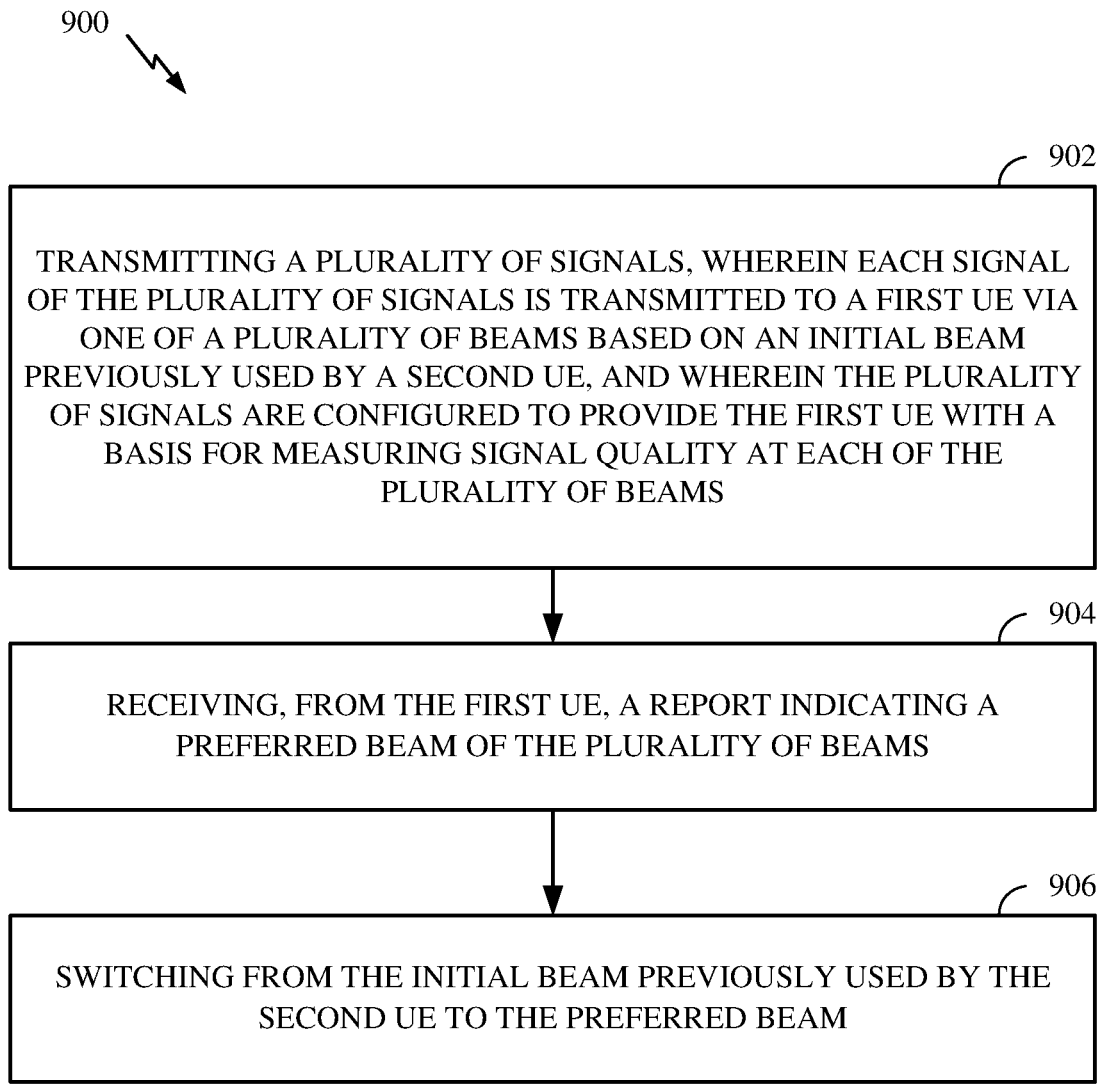
FIG. 9 is a flow diagram illustrating an example of a P2 procedure for beam management, in accordance with certain aspects of the present disclosure.

FIG. 9 is a flow diagram illustrating example operations 900 for a P2 procedure, in accordance with certain aspects of the present disclosure. The operations 900 may be performed by a UE. The UE may include any of the UEs illustrated and described in FIGS. 1-3 and 5-7. Operations 900 may be implemented as software components that are executed and run on one or more processors (e.g., controller/processor 340/380 of FIG. 3). Further, the transmission and reception of signals by the UE in operations 900 may be enabled, for example, by one or more antennas (e.g., antennas 334/352 of FIG. 3). In certain aspects, the transmission and/or reception of signals by the UE may be implemented via a bus interface of one or more processors (e.g., controller/processor 340/380) obtaining and/or outputting signals.

The operations 900 may begin, at 902, by transmitting a plurality of signals, wherein each signal of the plurality of signals is transmitted to a first UE via one of a plurality of beams based on an initial beam previously used by a second UE, and wherein the plurality of signals are configured to provide the first UE with a basis for measuring signal quality at each of the plurality of beams. At 904, the operations 900 proceed by receiving, from the first UE, a report indicating a preferred beam of the plurality of beams. At 906, the operations 900 proceed by switching from the initial beam previously used by the second UE to the preferred beam.

Figure 10:
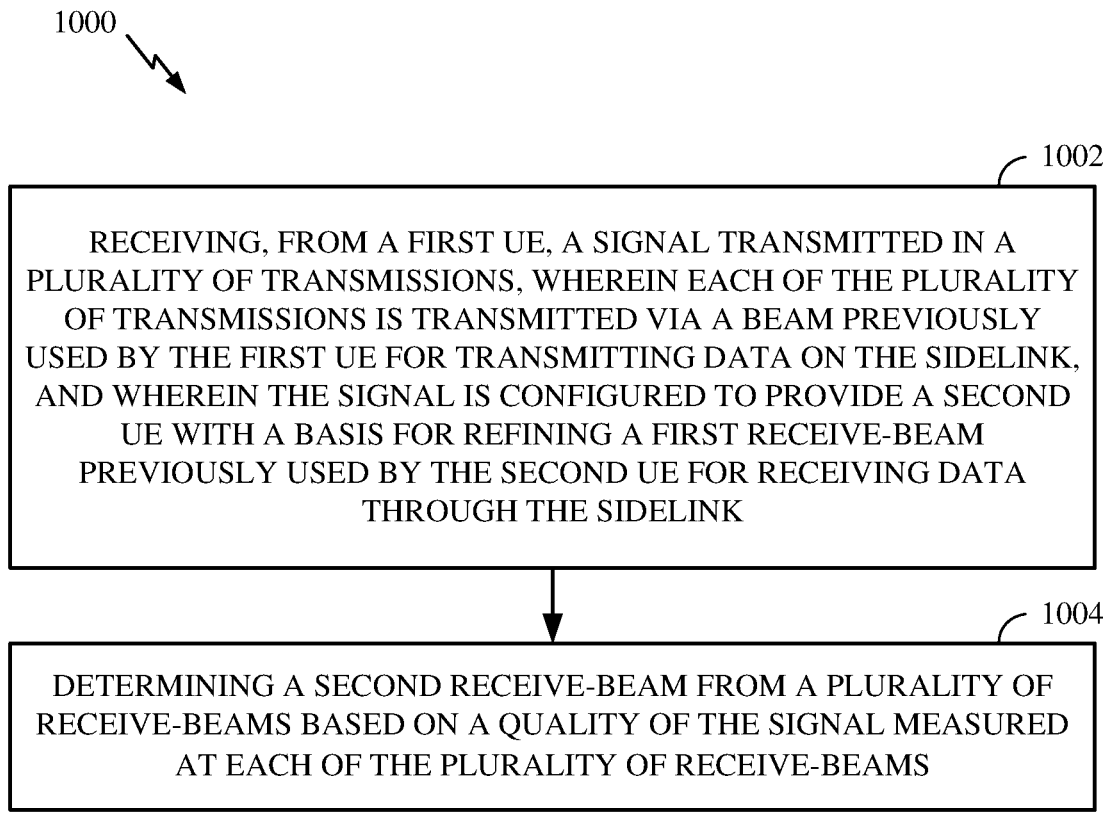
FIG. 10 is a flow diagram illustrating an example of a P3 procedure for beam management, in accordance with certain aspects of the present disclosure.

FIG. 10 is a flow diagram illustrating example operations 1000 for a P3 procedure, in accordance with certain aspects of the present disclosure. The operations 1000 may be performed by a UE. The UE may include any of the UEs illustrated and described in FIGS. 1-3 and 5-7. Operations 1000 may be implemented as software components that are executed and run on one or more processors (e.g., controller/processor 340/380 of FIG. 3). Further, the transmission and reception of signals by the UE in operations 1000 may be enabled, for example, by one or more antennas (e.g., antennas 334/352 of FIG. 3). In certain aspects, the transmission and/or reception of signals by the UE may be implemented via a bus interface of one or more processors (e.g., controller/processor 340/380) obtaining and/or outputting signals.

The operations 1000 may begin, at 1002, by receiving, from a first UE, a signal transmitted in a plurality of transmissions, wherein each of the plurality of transmissions is transmitted via a beam previously used by the first UE for transmitting data on the sidelink, and wherein the signal is configured to provide a second UE with a basis for refining a first receive-beam previously used by the second UE for receiving data through the sidelink. At 1004, the operations 1000 proceed by determining a second receive-beam from a plurality of receive-beams based on a quality of the signal measured at each of the plurality of receive-beams.

Figure 11:
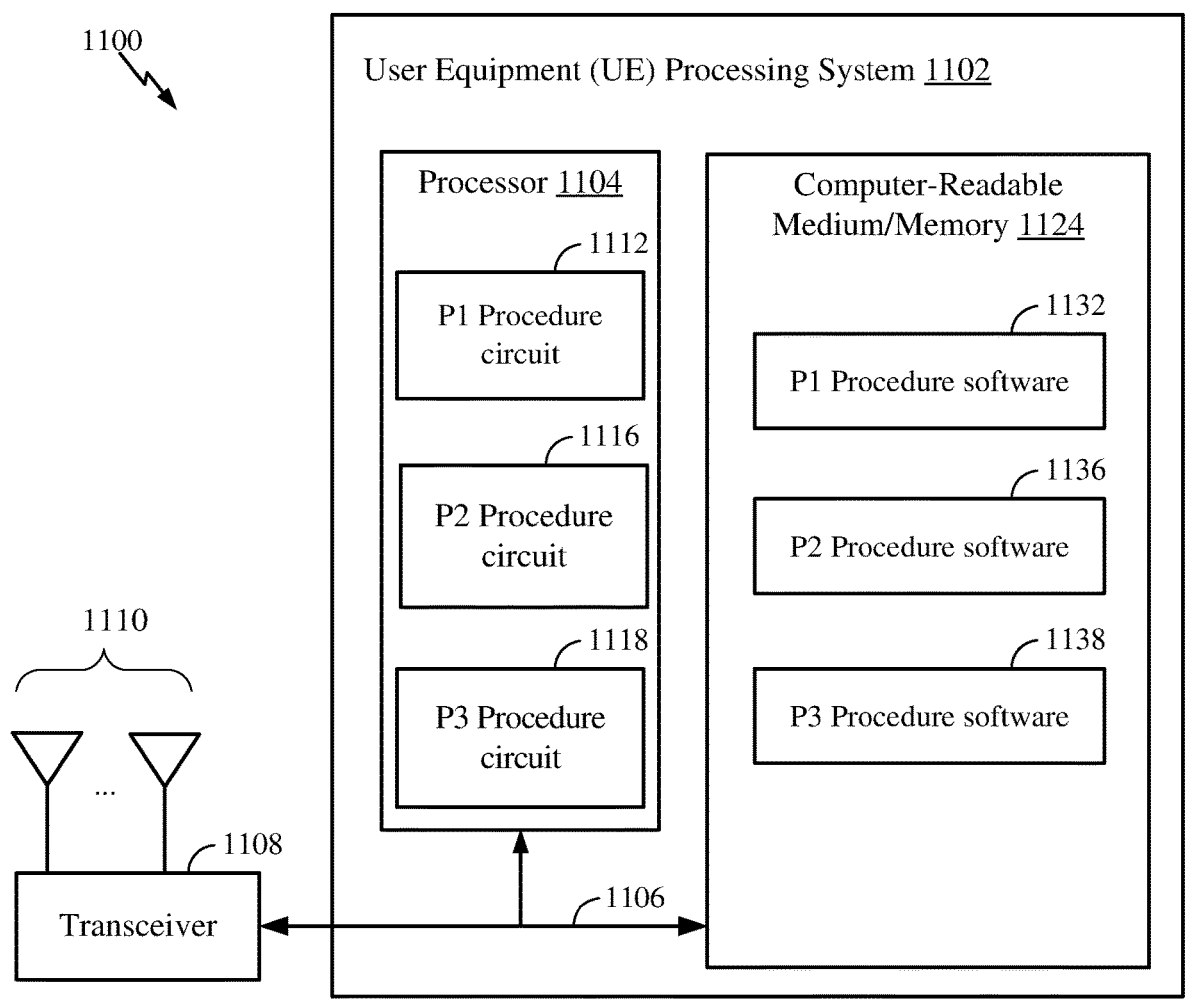
FIG. 11 illustrates a communications device that may include various components configured to perform operations for the techniques disclosed herein, in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIGS. 8-10. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIGS. 8-10, or other operations for performing the various techniques discussed herein for beam management of sidelink communication. In certain aspects, computer-readable medium/memory 1112 stores code for performing the P1, P2, and P3 procedures (1132, 1136, 1138) described above. In certain aspects, the processor 1104 has circuitry configured to implement the code stored in the computer-readable medium/memory 1112. The processor 1104 includes circuitry for performing the P1, P2, and P3 procedures (1112, 1116, 1118) described above.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

EXAMPLE EMBODIMENTS

Embodiment 1: A method of wireless communication by a first user equipment (UE), comprising selecting a first beam for transmission of a first signal used for beam management for a sidelink between the first UE and a second UE; transmitting the first signal in a first plurality of transmissions, wherein each of the first plurality of transmissions is transmitted via the first beam according to a first periodic interval, and wherein the first signal is configured to provide the second UE with a basis for selecting a second beam for receiving data on the sidelink; receiving, from the second UE, a second signal transmitted in a second plurality of transmissions according to a second periodic interval, wherein the second signal is configured to provide the first UE with a basis for selecting a third beam for receiving data on the sidelink; and selecting the third beam for reception of data on the sidelink, wherein the selection is based on the received second signal.

Embodiment 2: The method of Embodiment 1, wherein selecting the first beam further comprises one or more of selecting the first beam randomly from a plurality of beams; selecting the first beam from one or more beams corresponding to a sidelink resource comprised by the first UE; or selecting the first beam from a plurality of beams based on a sounding reference signal received from the second UE.

Embodiment 3: The method Embodiment 1, wherein communication on the sidelink is performed according to a time division duplex (TDD) communication protocol, and wherein each of the plurality of transmissions of the second signal is transmitted via the second beam.

Embodiment 4: The method of Embodiment 1, wherein the first signal and the second signal include one or more sidelink synchronization signal blocks (S-SSBs).

Embodiment 5: The method of Embodiment 1, wherein the first signal and the second signal comprise one or more of a sounding reference signal (SRS), a demodulation reference signal (DMRS), or a channel state information reference signal (CSI-RS).

Embodiment 6: The method of Embodiment 1, wherein the first signal and the second signal comprise a beam management reference signal (BM-RS) configured for sidelink beam management between the first UE and the second UE.

Embodiment 7: The method of Embodiment 1, further comprising determining a first starting time for transmitting the first signal, and a second starting time for receiving the second signal, wherein the first starting time and the second starting time are based on one or any combination of: a configuration from network via radio resource control (RRC) message, medium access control-control element (MAC-CE), downlink control information (DCI), a sidelink resource of the first UE, or a periodic global positioning system (GPS) signal.

Embodiment 8: A method of wireless communication by a first user equipment (UE), comprising transmitting a message configured to initiate a beam sweeping operation for beam management of a sidelink between the first UE and a second UE.

Embodiment 9: The method of Embodiment 8, wherein the beam sweeping operation comprises: transmitting a first plurality of signals, wherein each signal of the first plurality of signals is transmitted to the second UE via one of a first plurality of beams based on an initial beam previously used by the first UE, and wherein the first plurality of signals are configured to provide the second UE with a basis for measuring signal quality at each of the first plurality of beams; receiving, from the second UE, a first report indicating a first preferred beam of the first plurality of beams; and switching from the initial beam previously used by the first UE to the first preferred beam.

Embodiment 10: The method of Embodiment 9, wherein the beam sweeping operation further comprises: receiving a second plurality of signals in response to the message and after receiving the first report, wherein each signal of the second plurality of signals is received via one of a second plurality of beams based on an initial beam previously used by the second UE, and wherein the second plurality of signals are configured to provide the first UE with a basis for measuring signal quality at each of the second plurality of beams; determining a second preferred beam from the second plurality of beams, wherein the determination is based on signal quality measured at one or more of the second plurality of beams; and transmitting a second report indicating the second preferred beam to the second UE.

Embodiment 11: The method of Embodiment 8, wherein the beam sweeping operation comprises: receiving a first plurality of signals in response to the message, wherein each signal of the first plurality of signals is received via one of a first plurality of beams based on an initial beam previously used by the second UE, and wherein the first plurality of signals are configured to provide the first UE with a basis for measuring signal quality at each of the first plurality of beams; determining a first preferred beam from the first plurality of beams, wherein the determination is based on signal quality measured at one or more of the first plurality of beams; and transmitting a first report indicating the first preferred beam to the second UE.

Embodiment 12: The method of Embodiment 11, wherein the beam sweeping operation further comprises: transmitting a second plurality of signals after transmitting the first report, wherein each signal of the second plurality of signals is transmitted to the second UE via one of a second plurality of beams based on an initial beam previously used by the first UE, and wherein the second plurality of signals are configured to provide the second UE with a basis for measuring signal quality at each of the second plurality of beams; receiving, from the second UE, a second report indicating a second preferred beam of the second plurality of beams; and switching from the initial beam previously used by the first UE to the second preferred beam.

Embodiment 13: The method of an of Embodiments 9-12, wherein one or more of the first plurality of signals or the second plurality of signals is transmitted in the same slot comprising the message configured to initiate a beam sweeping operation for beam management of a sidelink between the first UE and a second UE.

Embodiment 14: The method of any of Embodiments 9-12, further comprising transmitting one or more of the first report or the second report using: one or more physical sidelink control channel (PSCCH) resources; or one or more scheduled physical sidelink feedback channel (PSFCH) resources identified in the message.

Embodiment 15: The method of any of Embodiments 9-12, wherein one or more of the first report or the second report is received via: one or more scheduled physical sidelink feedback channel (PSFCH) resources identified in the message and/or based on a sidelink resource comprised by the first UE; or a physical sidelink control channel (PSCCH).

Embodiment 16: The method of any of Embodiments 8-12, wherein the message configured to initiate the beam sweeping operation is further configured to indicate a time delay between resources used for transmission of the first plurality of signals and resources used for the first report.

Embodiment 17: The method of any of Embodiments 8-12, wherein the message configured to initiate the beam sweeping operation is further configured to indicate a time delay between the message and the resources used for transmission of one or more of the first plurality of signals or the second plurality of signals.

Embodiment 18: The method of any of Embodiments 8-12, wherein one or more of the first plurality of signals or the second plurality of signals are transmitted in the same slot comprising the message configured to initiate a beam sweeping operation for beam management of a sidelink between the first UE and a second UE.

Embodiment 19: The method of Embodiment 8, further comprising transmitting the message via a physical sidelink control channel (PSCCH).

Embodiment 20: The method of Embodiment 8, wherein the message is transmitted via one or more slots in a physical sidelink control channel (PSCCH).

Embodiment 21: A method of wireless communication by a first user equipment (UE), comprising transmitting a message configured to initiate a receive-beam refining operation for beam management of a sidelink between the first UE and a second UE.

Embodiment 22: The method of Embodiment 21, wherein the receive-beam refining operation comprises transmitting a first signal in a first plurality of transmissions, wherein each of the first plurality of transmissions is transmitted via a beam previously used by the first UE for transmitting data on the sidelink, and wherein the first signal is configured to provide the second UE with a basis for refining a first receive-beam previously used by the second UE for receiving data through the sidelink.

Embodiment 23: The method of Embodiment 22, wherein the receive-beam refining operation further comprises: receiving, from the second UE, a second signal transmitted in a second plurality of transmissions in response to the message and after transmitting the first signal, wherein each of the second plurality of transmissions is transmitted via a beam previously used by the second UE for transmitting data on the sidelink, and wherein the second signal is configured to provide the first UE with a basis for refining a first receive-beam previously used by the first UE for receiving data through the sidelink; and determining a second receive-beam from a plurality of receive-beams based on a quality of the second signal measured at each of the plurality of receive-beams.

Embodiment 24: The method of Embodiment 21, wherein the receive-beam refining operation comprises: receiving, from the second UE, a first signal transmitted in a first plurality of transmissions in response to the message, wherein each of the first plurality of transmissions is transmitted via a beam previously used by the second UE for transmitting data on the sidelink, and wherein the first signal is configured to provide the first UE with a basis for refining a first receive-beam previously used by the first UE for receiving data through the sidelink; and determining a second receive-beam from a first plurality of receive-beams based on a quality of the first signal measured at each of the first plurality of receive-beams.

Embodiment 25: The method of Embodiment 24, wherein the beam refining operation further comprises transmitting a second signal in a second plurality of transmissions after receiving the first plurality of transmissions, wherein each of the second plurality of transmissions is transmitted via a beam previously used by the first UE for transmitting data on the sidelink, and wherein the second signal is configured to provide the second UE with a basis for refining a second receive-beam previously used by the second UE for receiving data through the sidelink.

Embodiment 26: The method of any of Embodiments 22-25, wherein one or more of the first signal or the second signal comprises one or more of a sounding reference signal (SRS), a demodulation reference signal (DMRS), or a channel state information reference signal (CSI-RS), or a beam management reference signal (BM-RS).

Embodiment 27: The method of any of Embodiments 22-25, wherein one or more of the first signal or the second signal are transmitted in the same slot comprising the message configured to initiate the beam refining operation for beam management of the sidelink between the first UE and the second UE.

Embodiment 28: The method of any of Embodiments 22-25, via one or more slots in a physical sidelink control channel (PSCCH).

Embodiment 29: The method of any of Embodiments 22-25, further comprising transmitting the message via a physical sidelink control channel (PSCCH).

Embodiment 30: The method of any of Embodiments 22-25, wherein the message configured to initiate the receive-beam refining operation is further configured to indicate a time delay between the message and the resources used for transmission of one or more of the first signal or the second signal.

Embodiment 31: The method of any of Embodiments 22-25, wherein one or more of the first signal or the second signal is transmitted in the same slot comprising the message configured to initiate the beam refining operation for beam management of a sidelink between the first UE and a second UE.

Embodiment 32: The method of any of Embodiments 22-25, wherein the message configured to initiate the receive-beam refining operation is further configured to indicate a time delay between resources used for transmitting one or more of the first signal or the second signal, and resources used for transmitting the first signal and second signal in the second plurality of transmissions.

Embodiment 33: The method of Embodiment 23, wherein the message configured to initiate the receive-beam refining operation is further configured to indicate a time delay between resources used for transmitting the first signal, and resources used for transmitting the second signal.

Embodiment 34: The method of Embodiment 25, wherein the message configured to initiate the receive-beam refining operation is further configured to indicate a time delay between resources used for transmitting the first signal, and resources used for transmitting the second signal.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 5-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a second user equipment (UE), the method comprising:
   receiving, from a first UE, a first signal in a burst of a first plurality of reference signals transmissions, wherein each of the burst of the first plurality of reference signals transmissions is transmitted via a first initial transmit beam according to a first time offset and a first periodic interval;
   selecting, after receiving the burst of the first plurality of reference signals and based on the burst of the first plurality of reference signals, a receive beam for reception of data from the first UE on a sidelink between the second UE and the first UE;
   selecting a second initial transmit beam corresponding to the receive beam; and
   transmitting, to the first UE, a second signal in a burst of a second plurality of reference signals transmissions via the second initial transmit beam according to a second time offset and a second periodic interval, wherein the second signal is configured to provide the first UE with a basis for selecting a third beam for receiving data from the second UE on the sidelink.

2. The method of claim 1, wherein communication on the sidelink is performed according to a time division duplex (TDD) communication protocol.

3. The method of claim 1, wherein the burst of the first plurality of reference signals and the second plurality of reference signals comprise a plurality of sidelink synchronization signal blocks (S-SSBs).

4. The method of claim 1, wherein the burst of the first plurality of reference signals and the burst of the second plurality of reference signals comprise one or more of a plurality of sounding reference signals (SRSs), a plurality of demodulation reference signals (DMRSs), or a plurality of channel state information reference signals (CSI-RSs).

5. The method of claim 1, wherein the burst of the first plurality of reference signals and the burst of the second plurality of reference signals comprise a plurality of beam management reference signals (BM-RSs) configured for sidelink beam management between the first UE and the second UE.

6. The method of claim 1, wherein at least one of: the first time offset or the second time offset are based on a configuration from a network via at least one of: a radio resource control (RRC) message, a medium access control-control element (MAC-CE), downlink control information (DCI), a sidelink resource of the first UE, or a periodic global positioning system (GPS) signal.

7. A method of wireless communication by a first user equipment (UE), the method comprising:
transmitting, to a second UE, a physical sidelink control channel (PSCCH) message configured to initiate a first transmit-beam refinement operation or a second transmit-beam refinement operation for beam management of a sidelink between the first UE and the second UE, wherein the first transmit-beam refinement operation comprises transmit-beam refinement of a transmit beam of the first UE and the second transmit-beam refinement operation comprises transmit-beam refinement of both the transmit beam of the first UE and a transmit beam of the second UE; and
in response to transmitting the PSCCH message, at least one of:
transmitting a burst of a first plurality of reference signals to the second UE, wherein each reference signal of the burst of the first plurality of reference signals is transmitted to the second UE via a different transmit beam of a first plurality of transmit beams of the first UE, wherein the first plurality of reference signals are configured to provide the second UE with a basis for selecting a first preferred transmit beam of the first plurality of transmit beams for the first UE to transmit data to the second UE on the sidelink; or
receiving a burst of a second plurality of reference signals from the second UE, wherein each reference signal of the burst of the second plurality of reference signals is associated with a different transmit beam of a second plurality of transmit beams of the second UE, wherein the second plurality of reference signals are configured to provide the first UE with a basis for selecting a second preferred transmit beam of the second plurality of transmit beams for the second UE to transmit data to the first UE on the sidelink.

8. The method of claim 7, wherein the message is configured to initiate the second transmit-beam refinement operation, further comprising:
in response to transmitting the burst of the first plurality of reference signals, receiving, from the second UE, a first report indicating the first preferred transmit beam of the first plurality of transmit beams; and
switching to the first preferred transmit beam for data transmission the second UE in response to the first report.

9. The method of claim 7, wherein the message is configured to initiate the first transmit-beam refinement operation, further comprising:
receiving, from the second UE, a first report indicating the first preferred transmit beam of the first plurality of transmit beams;
receiving the burst of the second plurality of reference signals in response to the message and after transmitting the burst of the first plurality of reference signals;
measuring signal quality of one or more of the burst of the second plurality of reference signals; and
transmitting, to the second UE, a second report indicating a second preferred transmit beam of the second plurality of transmit beams for data transmission by the second UE.

10. The method of claim 7, wherein the message is configured to initiate the second transmit-beam refinement operation, further comprising:
receiving the burst of the second plurality of reference signals in response to the message;
measuring signal quality of one or more of the burst of the second plurality of reference signals; and
transmitting, to the second UE, a first report indicating a first the second preferred transmit beam of the second plurality of transmit beams for data transmission by the second UE.

11. The method of claim 7, wherein the message is configured to initiate the first transmit-beam refinement operation, further comprising:
transmitting, to the second UE, a first report indicating a first preferred transmit beam of the second plurality of transmit beams for data transmission by the second UE;
transmitting the first plurality of reference signals after receiving the second plurality of reference signals;
receiving, from the second UE, a second report indicating a second preferred transmit beam of the first plurality of transmit beams; and
switching to the second preferred transmit beam for data transmission the second UE in response to the second report.

12. The method of claim 7, wherein the burst of the first plurality of reference signals is transmitted in a same slot as the message configured to initiate the first transmit-beam refinement operation or the second transmit-beam refinement operation.

13. The method of claim 10, wherein one or more of the first report or the second report is transmitted using:
one or more PSCCH resources; or
one or more scheduled physical sidelink feedback channel (PSFCH) resources identified in the message.

14. The method of claim 11, wherein one or more of the first report or the second report is transmitted using:
one or more scheduled physical sidelink feedback channel (PSFCH) resources identified in the message;
one or more PSFCH resources identified based on a sidelink resource comprised by the first UE; or
the PSCCH.

15. The method of claim 8, wherein the message configured to initiate the transmit-beam refinement operation is further configured to indicate a time delay between resources used for transmission of the first plurality of reference signals and resources used for the first report.

16. The method of claim 9, wherein the message configured to initiate the transmit-beam refinement operation is further configured to indicate a time delay between the message and resources used for transmission of the burst of the second plurality of reference signals.

17. The method of claim 8, wherein the second plurality of reference signals are transmitted in a same slot as the first report.

18. A method of wireless communication by a first user equipment (UE), the method comprising:
transmitting, to a second UE, a physical sidelink control channel (PSCCH) message configured to initiate a first receive-beam refinement operation or a second receive-beam refinement operation for beam management of a sidelink between the first UE and the second UE, wherein the first receive-beam refinement operation comprises receive-beam refinement of a receive beam of the first UE and the second receive-beam refinement operation comprises receive-beam refinement of both the receive beam of the first UE and a receive beam of the second UE; and in response to transmitting the PSCCH message, at least one of:

transmitting a burst of a first plurality of reference signals to the second UE, wherein each reference signal of the burst of the first plurality of reference signals is transmitted to the second UE via a first transmit beam of the first UE, wherein the first plurality of reference signals are configured to provide the second UE with a basis for selecting a first refined receive-beam for receiving data from the first UE on the sidelink; or receiving a burst of a second plurality of reference signals from the second UE, wherein each reference signal of the burst of the second plurality of reference signals is associated with a second transmit beam of the second UE, wherein the second plurality of reference signals are configured to provide the first UE with a basis for selecting a second refined receive-beam for receiving data from the second UE on the sidelink.

19. The method of claim 18, wherein the message is configured to initiate the second receive-beam refinement operation, and wherein the receive-beam refinement operation does not include receiving the burst of the second plurality of reference signals.

20. The method of claim 18, wherein the message is configured to initiate the first receive-beam refinement operation, and wherein the receive-beam refinement operation comprises:

transmitting the burst of the first plurality of reference signals to the second UE;

receiving after transmitting the burst of the first plurality of reference signals to the second UE, the burst of the second plurality of reference signals from the second UE, wherein the each reference signal of the burst of the second plurality of reference signals is received using a different receive-beam of the first UE;

measuring signal quality of one or more of the second plurality of reference signals; and determining the second refined receive-beam, for receiving data on the sidelink, from different receive-beams based on the measured signal quality of the burst of the second plurality of reference signals.

21. The method of claim 18, wherein the message is configured to initiate the second receive-beam refinement operation, and wherein the receive-beam refinement operation does not include transmitting the burst of the first plurality of reference signals to the second UE, the method further comprising:

measuring signal quality of one or more of the burst of the second plurality of reference signals; and determining a refined receive-beam from a first plurality of receive-beams based on the measured signal quality of the burst of the first plurality of reference signals.

22. The method of claim 18, wherein the message is configured to initiate the first receive-beam refinement operation, and wherein the receive-beam refinement operation comprises:

transmitting the burst of the first plurality of reference signals to the second UE after receiving the burst of the second plurality of reference signals from the second UE.

23. The method of claim 18, wherein one or more of the burst of the first plurality of reference signals or the burst of the second plurality of reference signals comprises one or more of a plurality of sounding reference signals (SRSs), a plurality of demodulation reference signals (DMRSs), a plurality of channel state information reference signals (CSI-RSs), or a plurality of beam management reference signals (BM-RSs).

24. The method of claim 18, wherein the burst of the first plurality of reference signals is transmitted in a same slot as the message configured to initiate the first receive-beam refinement operation or the second receive-beam refinement operation.

25. The method of claim 18, wherein the message configured to initiate the first receive-beam refinement operation or the second receive-beam refinement operation is further configured to indicate a time delay between the message and resources used for transmission of the burst of the first plurality of reference signals.

26. The method of claim 18, wherein the message configured to initiate the first receive-beam refinement operation or the second receive-beam refinement operation is further configured to indicate a time delay between resources used for transmitting the burst of the second plurality of reference signals and resources used for transmitting the burst of the first plurality of reference signals.

27. The method of claim 18, wherein the message configured to initiate the first receive-beam refinement operation or the second receive-beam refinement operation is further configured to indicate a time delay between the message and resources used for transmitting the burst of the second plurality of reference signals.

* * * * *